*Inventor*
Ernest W. Stacey Dec'd
Helen M. Stacey Exrx.
By their Attorney

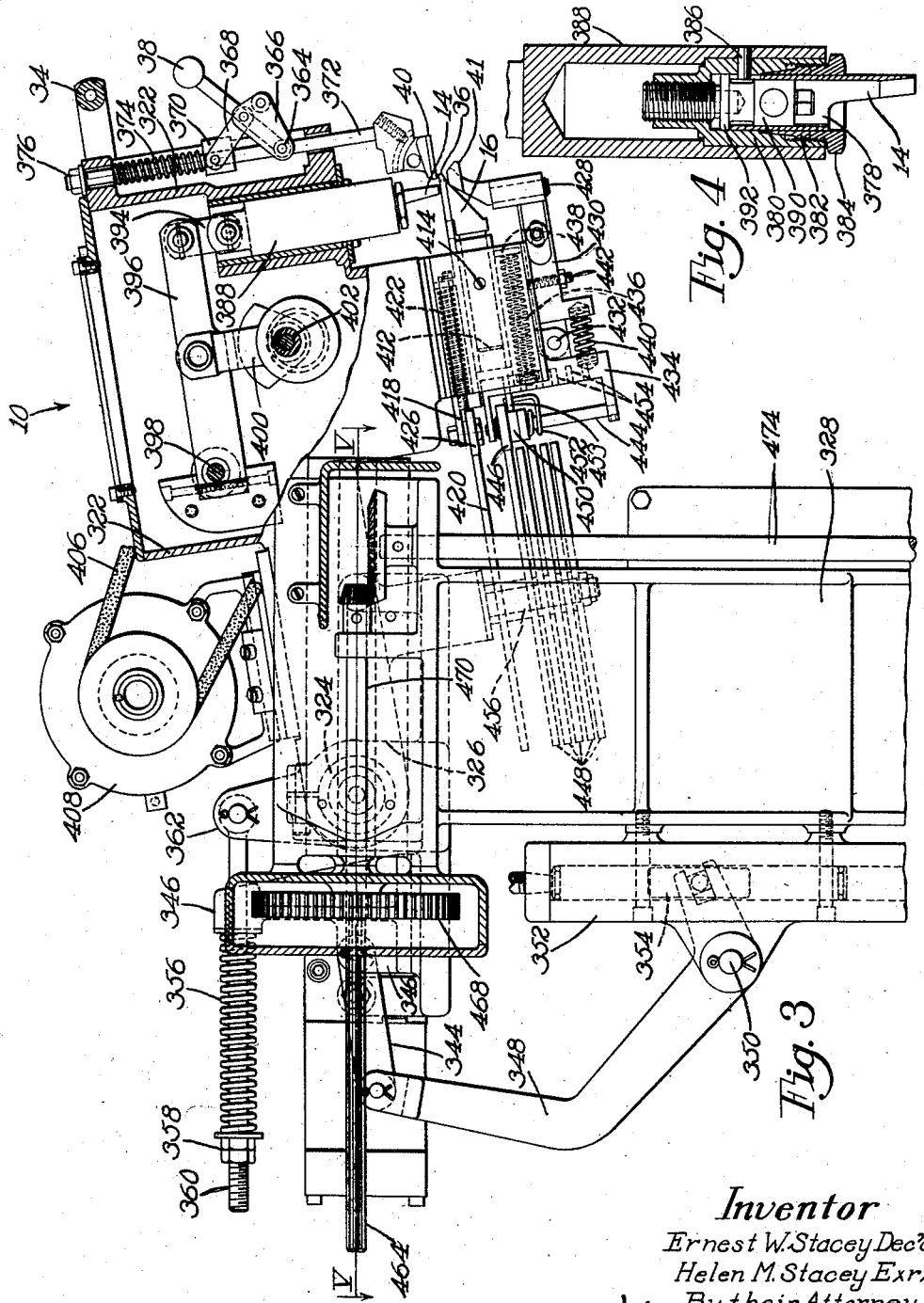

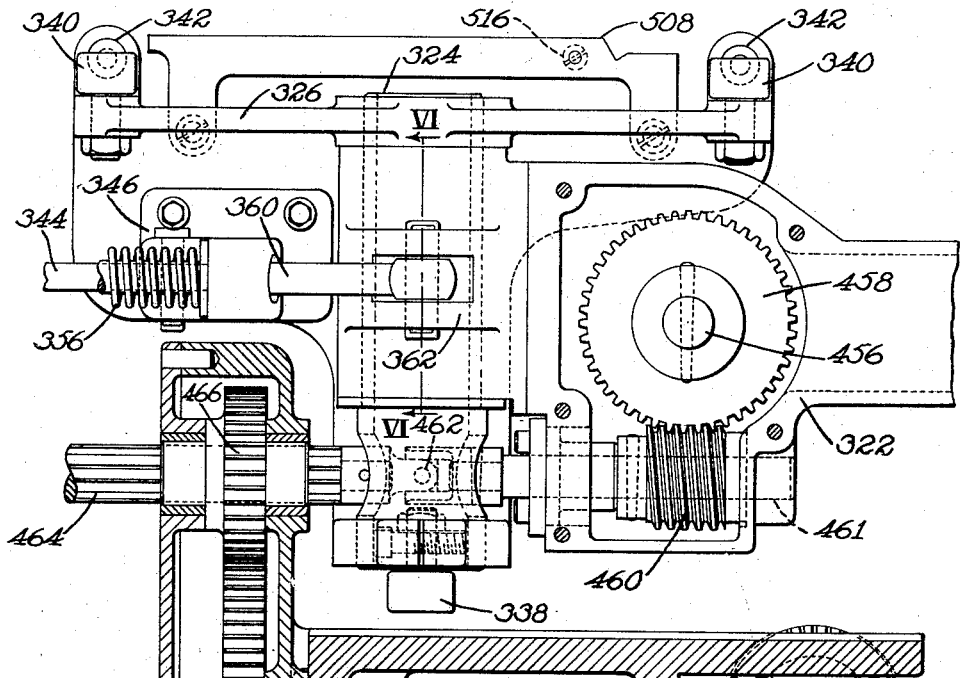
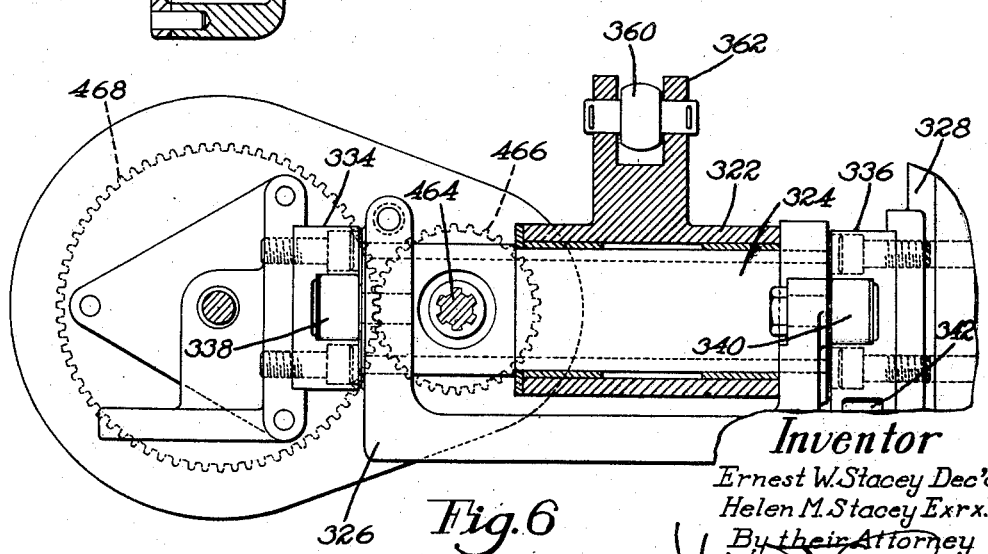
Fig.5
Fig.6
Inventor
Ernest W. Stacey Dec'd
Helen M. Stacey Exrx.
By their Attorney

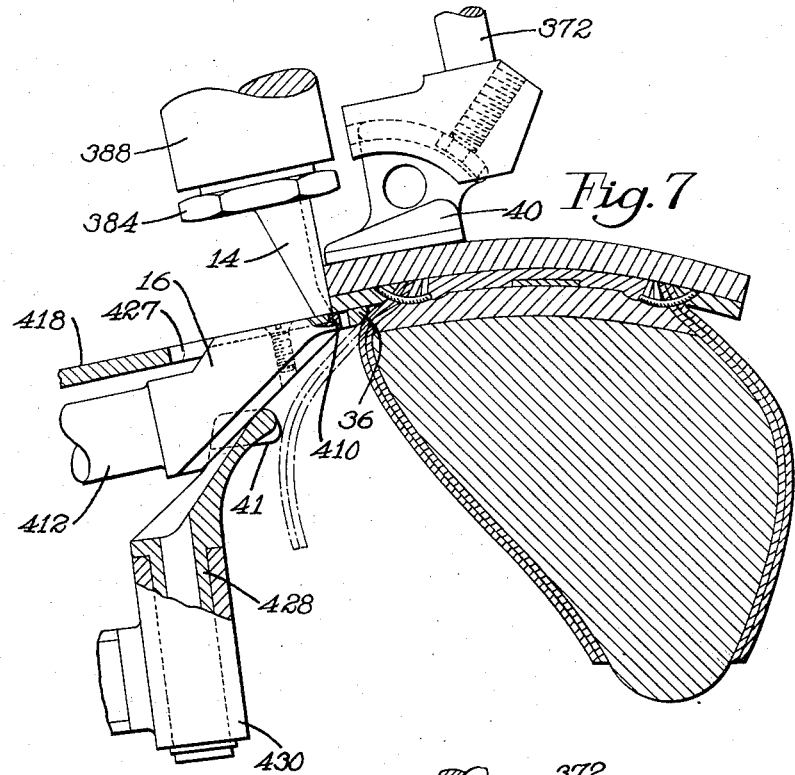
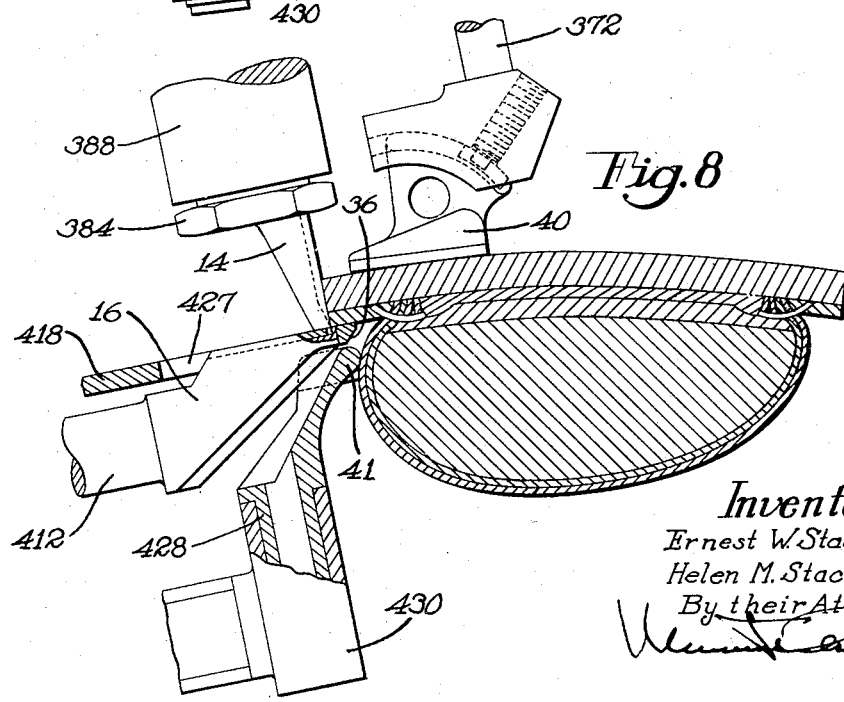

Jan. 20, 1959  E. W. STACEY  2,869,156
ROUGH ROUNDING MACHINES
Filed Jan. 17, 1956  19 Sheets-Sheet 12

Inventor
Ernest W. Stacey Dec'd
Helen M. Stacey Exrx.
By their Attorney

Jan. 20, 1959   E. W. STACEY   2,869,156
ROUGH ROUNDING MACHINES
Filed Jan. 17, 1956   19 Sheets-Sheet 15
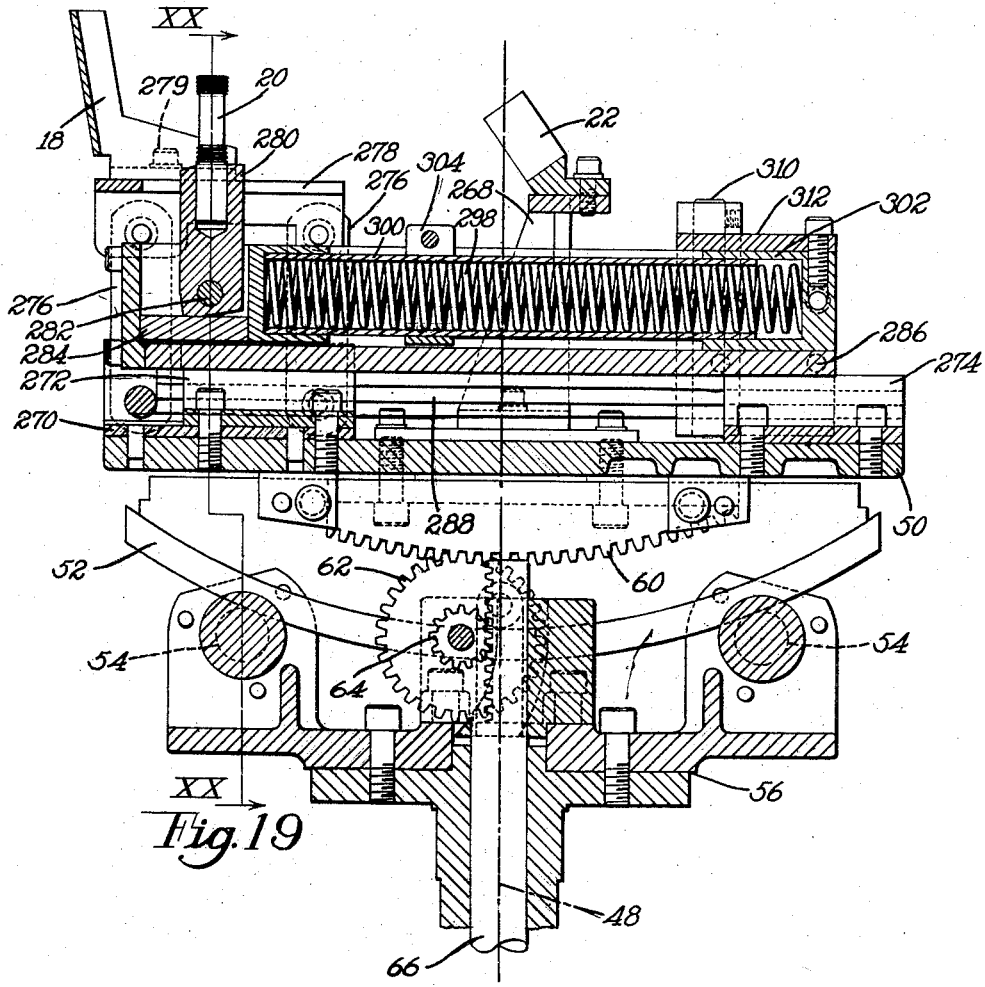
Fig.19
Inventor
Ernest W. Stacey Dec'd
Helen M. Stacey Exrx.
By their Attorney

Jan. 20, 1959  E. W. STACEY  2,869,156
ROUGH ROUNDING MACHINES
Filed Jan. 17, 1956  19 Sheets-Sheet 16
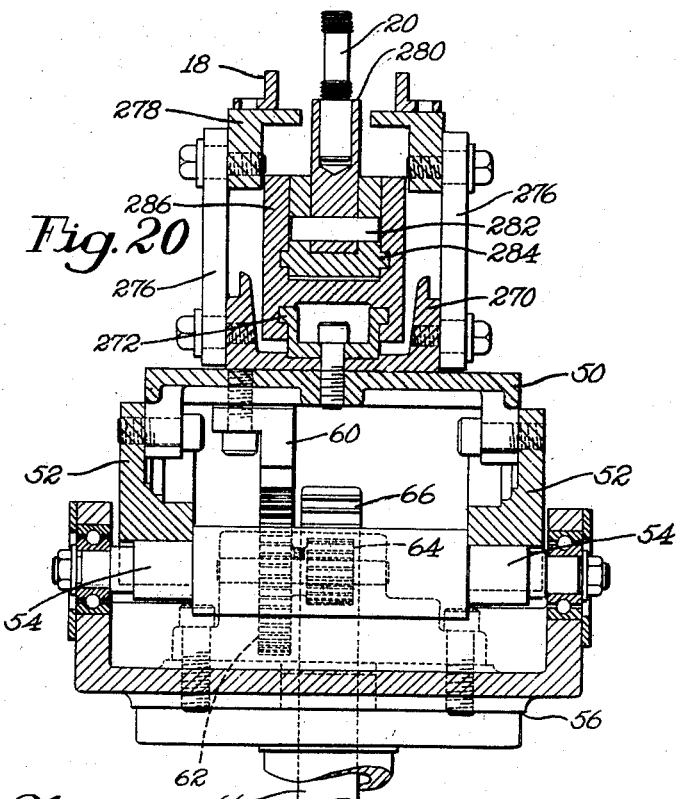
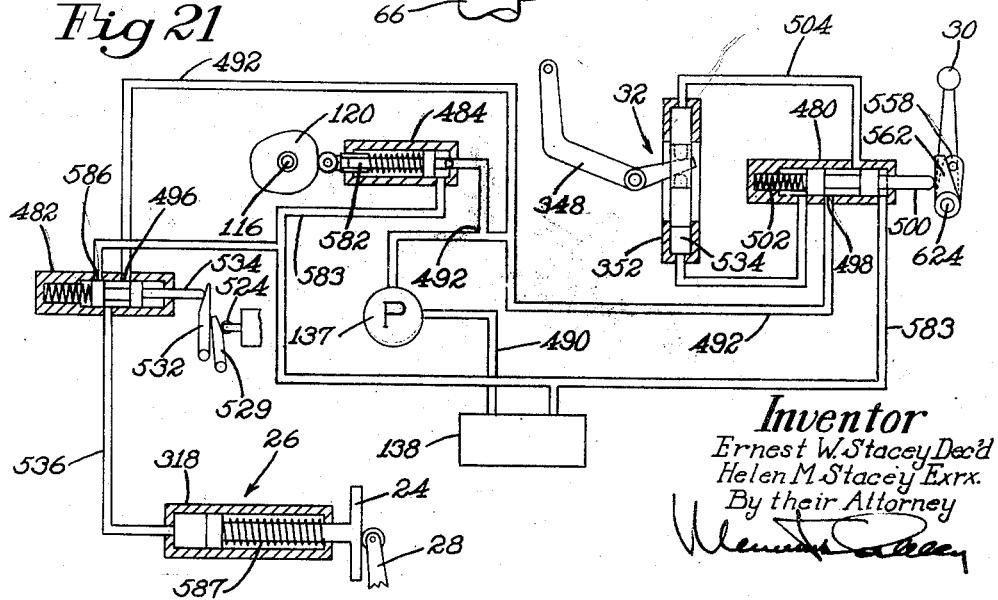
Inventor
Ernest W. Stacey Dec'd
Helen M. Stacey Exrx.
By their Attorney Jan. 20, 1959     E. W. STACEY     2,869,156
ROUGH ROUNDING MACHINES
Filed Jan. 17, 1956     19 Sheets-Sheet 17

*Inventor*
*Ernest W. Stacey Dec'd*
*Helen M. Stacey Exrx.*
*By their Attorney*

Jan. 20, 1959 E. W. STACEY 2,869,156
ROUGH ROUNDING MACHINES
Filed Jan. 17, 1956 19 Sheets-Sheet 18

Inventor
Ernest W. Stacey Dec'd
Helen M. Stacey Exrx.
By their Attorney

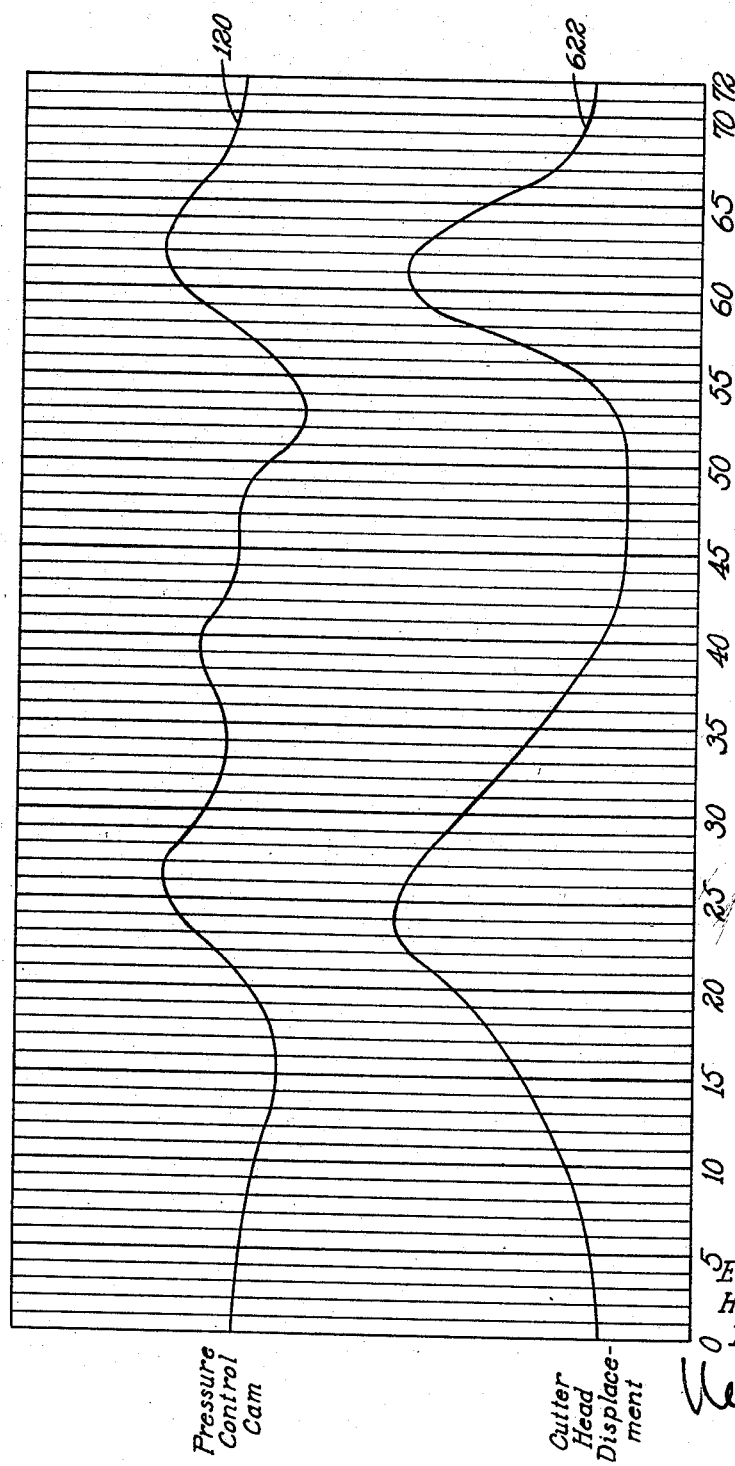

2,869,156

ROUGH ROUNDING MACHINES

Ernest W. Stacey, deceased, late of Beverly, Mass., by Helen M. Stacey, executrix, Beverly, Mass., assignor to United Shoe Machinery Corporation, Flemington, N. J., a corporation of New Jersey Application January 17, 1956, Serial No. 559,654

47 Claims. (Cl. 12—17.2)

This invention relates to rough rounding machines and more particularly to an automatic rounding machine embodying various features of a machine of the type disclosed in United States Letters Patent No. 2,682,674, granted July 6, 1954, upon an application of E. W. Stacey, and modifications thereof by which it is adapted for the rough rounding of attached soles.

In the Stacey machine unattached soles are rounded in conformity to a pattern, the soles and pattern being mounted upon a jack which is oscillated about one axis and simultaneously rotated about another so as to move the work past the point of operation of a cutter head thereupon in a path which resembles the peripheral contour of the pattern. Because the resemblance between the above-mentioned path and the contour of the pattern is not complete, the cutter head is mounted for movement toward and away from the jack under the control of the pattern and is biased toward it by a constant fluid pressure throughout the rounding operation. Thus, throughout a rounding operation the cutter head has a work following movement directed alternately rearwardly and forwardly of the jack under the control of the pattern, each rearward movement of the cutter head being caused by a camming action between the pattern and cutter head.

It will now be evident that if the cutter head is biased by a constant force toward the work, as in the Stacey machine, the pressure of the cutter head upon the pattern will be increased with every rearward movement of the cutter head and diminished with every forward movement of the cutter head because of the inertia of the cutter head.

This condition is not detrimental to the operation of the Stacey machine, so long as the pressure of the cutter head against the pattern does not drop below a certain minimum, for the maximum pressure is readily resisted by the pattern. However, if as in the present machine, the cutter head is positioned by engagement with the side of a shoe, instead of a pattern, an excessive bearing pressure between the cutter head and the shoe causes the latter to be marred.

With a view to minimizing the contribution to this tendency made by the motion of the jack, the illustrative machine is provided with an improved jack driving mechanism which is fully disclosed and claimed in United States Letters Patent No. 2,825,076, granted March 4, 1958, upon an application of G. W. Cleversey. However, even with this jack structure there is sufficient movement of the cutter head toward and away from the jack to cause the pressure between the cutter head and the shoe to be affected materially by the inertia of the cutter head.

In view of the foregoing, it is an object of the invention to compensate for the effects of inertia upon the bearing pressure between a cutter head and a jack of the type referred to above which occur at the beginning of the shoe following movements of the cutter head.

To this end, and in accordance with one feature of the present invention, provision has been made in the illustrative machine for applying a pressure to the cutter head, for maintaining its engagement with the shoe, which is varied in a predetermined relation to the progress of operation of the cutter head upon the shoe about its periphery, the pressure being diminished for each rearward movement of the cutter head away from the jack and increased for each forward movement of the cutter head toward the jack.

Such control of the head in the illustrated machine is provided by a fluid operated mechanism including a cam which is rotated in synchronism with the movement of the jack and is so shaped as to operate a valve in the fluid system for varying the pressure therein with the effect stated above.

Control mechanism, involving various novel features of the invention, is operated by the operator to cause the cutter head to be advanced from an inoperative position into operative relation to the shoe. With the cutter head in engagement with the shoe a cycle of operation of the jack driving mechanism is initiated by the operator at the end of which, when the entire periphery of the shoe will have been presented to the cutter head, the jack automatically stops.

Provision is made in the above-mentioned control mechanism, in accordance with one feature of the invention, for automatically returning the cutter head to its inoperative position at the end of a cycle of operation of the jack. Other novel structure of the control mechanism is actuated by movement of the cutter head out of and into its inoperative position for actuating mechanism for operating the jack to clamp the lasted shoe thereupon, before the rounding operation is begun, and to unclamp the lasted shoe at the completion of the rounding operation, respectively. Still another provision has been made in the above-mentioned control mechanism, in accordance with a further feature of the invention, for preventing the jack operating means from being operated, if the cutter head is returned to its inoperative position before a cycle of operation of the jack driving mechanism is completed, whereby any danger of interference between the jack and the jack operating means is avoided.

As is well known in this art, rough rounding machines are commonly provided with a forepart gage and a crease guide which are employed during different stages of the operation to control the width of the sole edge extension which is produced by the rounding cut. In the operation of such machines to which the work is presented by hand, considerable skill is required of the operator to insure that interchanges of the forepart gage and crease guide between their inoperative and inoperative positions will be made both at the proper stage of the rounding operation and also so smoothly as to avoid the formation of any irregularity in the sole edge.

These difficulties are avoided in the use of the present machine owing to the provision therein, in accordance with a further feature of the invention, with a cutter head upon which a forepart gage and crease guide are mounted for movement between operative and inoperative positions, a jack for presenting a shoe thereon to the cutter head, and driving means for relatively moving the jack and cutter head to cause the operating point of the cutter head upon the shoe to be transferred progressively about its periphery, of mechanism for moving the gage and guide in opposite directions at a predetermined stage of the rounding cut to bring the gage and guide selectively into their operative positions, whereby the interchanges of the forepart gage and crease guide are made automatically, eliminating the need for, and errors in, an operator's judgment. The mechanism for thus operating the gage and guide is constructed and arranged not only to effect interchanges of the gage and guide when the rounding cut passes the junctions of the shank with the forepart but, in accordance with a further feature of the invention, when the rounding cut is transferred across the junctions of the shank with the heel part of the shoe.

Further novel structure provided by the invention resides in the illustrated jack which is susceptible of adjustment for various sizes of shoes without varying the pressure required to operate the jack, as well as the fact that the jack is so mounted with relation to the jack operating means that the latter acts upon the jack in a direction extending directly toward and away from the axis of rotation of the jack upon its carrier.

These and other features of the invention, including various details of construction and combinations of parts, will now be described in detail and pointed out in the appended claims.

In the drawings,

Fig. 3 is a side elevation of the cutter head as viewed from the left;

Fig. 4 is a sectional elevation of the rounding cutter and its mounting;

Fig. 5 is a sectional plan view of a part of the mounting and driving mechanism for the cutter head, the section being taken along the line V—V in Fig. 3;

Fig. 6 is a sectional front elevation of structure shown in Fig. 5, the section being taken along the line VI—VI;

Figs. 7 and 8 are sectional elevations illustrating the relation of the shoe to the cutter, and to the shoe positioning and supporting elements when the shank and forepart portions, respectively, of the shoe are operated upon;

Fig. 19 is a sectional front elevation of the jack, the section being taken along the line XIX—XIX in Fig. 18;

Fig. 20 is a sectional elevation of the jack, the section being taken along the line XX—XX of Fig. 19;

Fig. 21 is a diagrammatical view of the fluid pressure system and associated operating means for the cutter head and jack;

Figure 24:
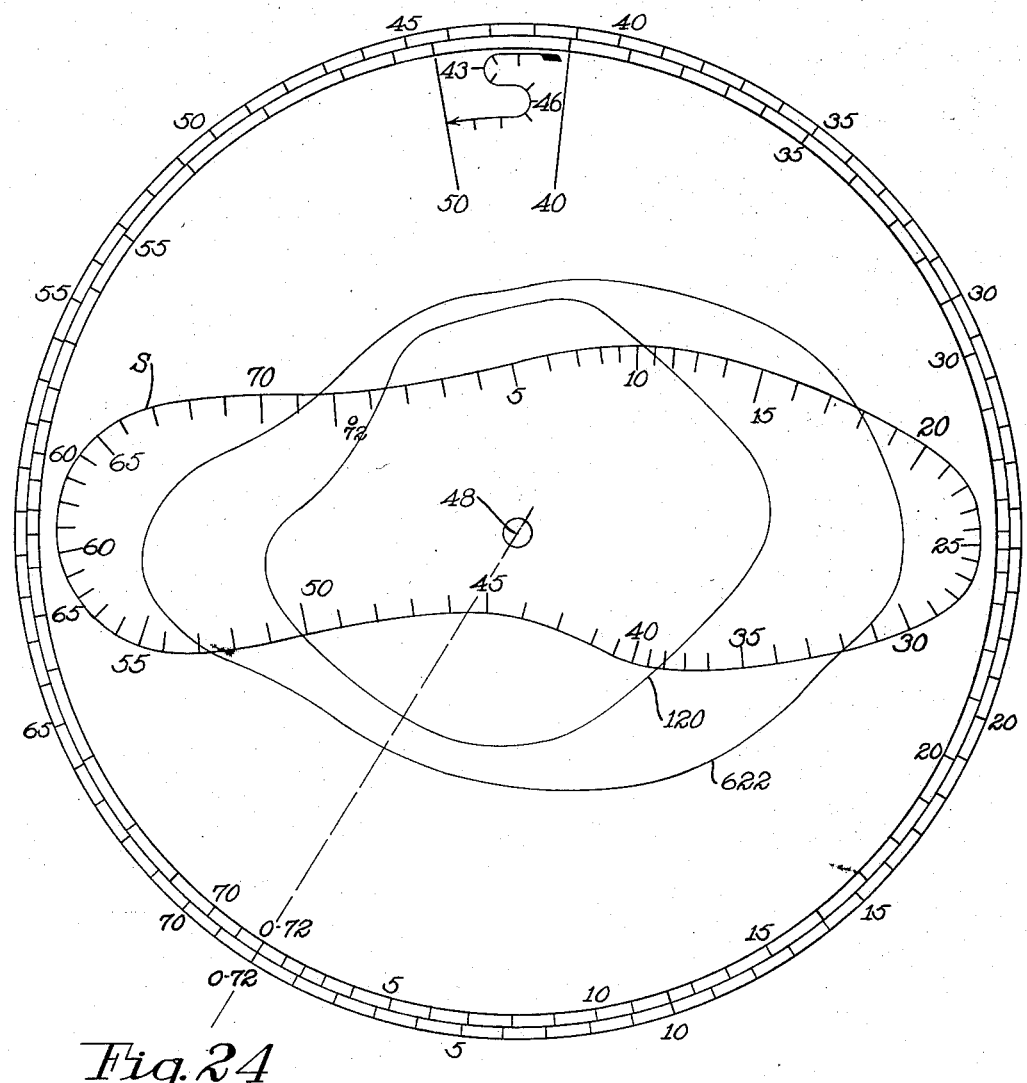

Fig. 24 represents diagrammatically the speed characteristics of the jack driving mechanism and of the feeding movement of the work, and also the relation between the shoe, following movement of the cutter head and the cam for controlling the bearing pressure of the cutter head against the work; and Fig. 25 represents the relation between the form of the cutter head control cam and the shoe following movement of the cutter head based upon a rectilinear reference line.

Figure 1:
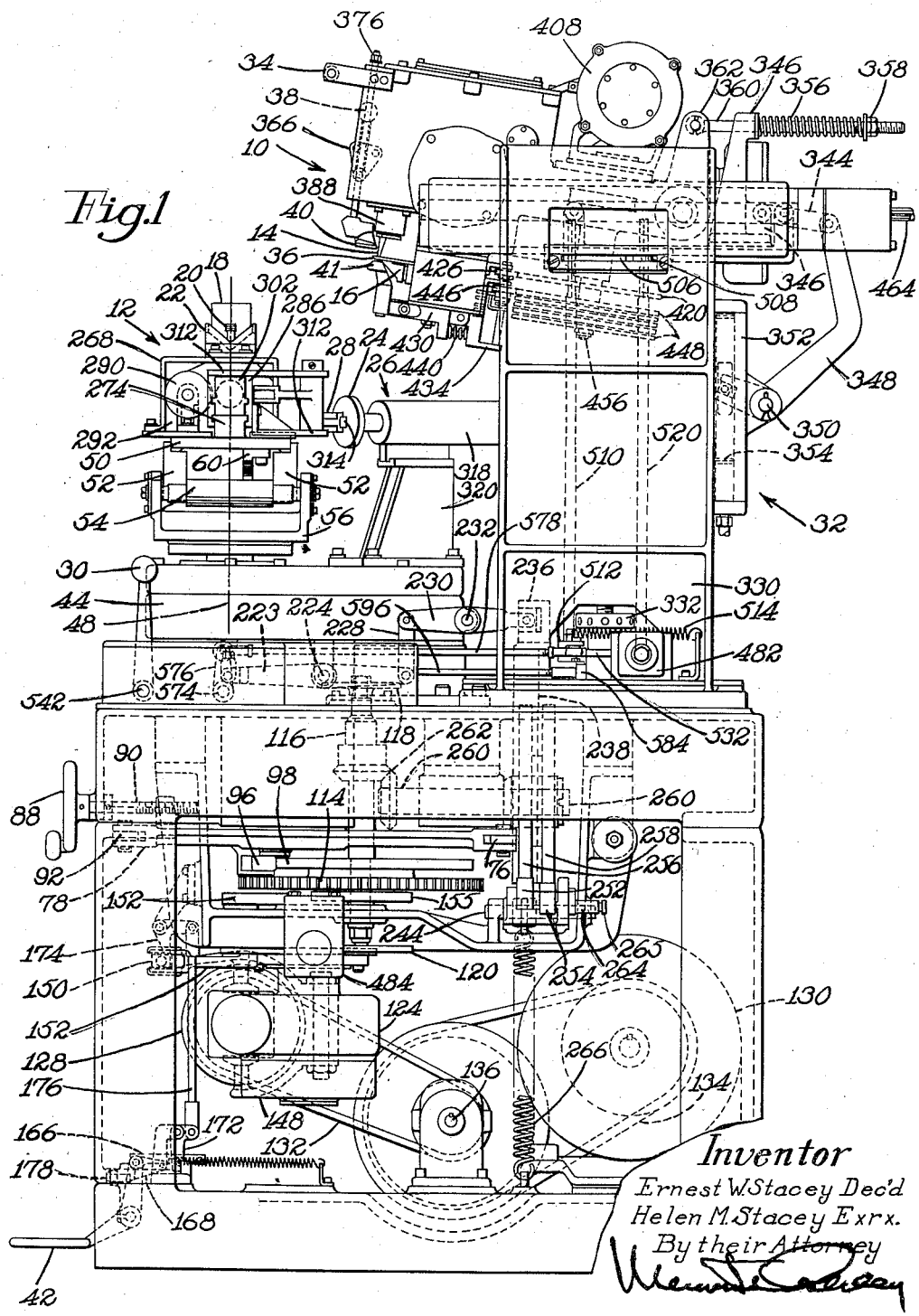
Fig. 1 is a side elevation of an illustrative machine embodying the invention, the machine being viewed from the right.

The illustrative machine comprises a cutter head 10, which normally is in an inoperative position as illustrated in Fig. 1, retracted from a jack 12 for holding a lasted shoe upon which a rough rounding operation is to be performed. The rounding cut is effected by a succession of chopping cuts made by a reciprocatory chopping knife 14 which cooperates, in shearing relation, with an anvil 16 fixedly mounted in the cutter head. A lasted shoe to be operated upon is placed in the jack which has a heel abutment 18 (Fig. 2) for positioning the shoe lengthwise of the jack, a jack pin 20 adapted to be received in the thimble in the heel part of the last, and a rest 22 for supporting the forepart of the last. The jack includes means normally acting upon the jack pin 20 to cause the last to be firmly clamped by the heel abutment, jack pin and forepart rest; but between successive cycles of operation of the machine, and while the cutter head is in its inoperative position, a plunger 24 (Fig. 1) of a jack operating means 26 is advanced into engagement with a driving member 28, associated with the jack, to remove the clamping pressure from the jack pin 20 thereby permitting the removal from the jack of the lasted shoe at the completion of a rounding operation and the mounting upon the jack of the lasted shoe next to be operated upon.

After having placed a lasted shoe on the jack, the operator pulls forwardly a control lever 30 which causes the release of the cutter head 10 for advancing movement into engagement with the shoe under the impulse of a fluid operated mechanism 32. This mechanism holds the cutter head against the shoe with a variable pressure during the rounding operation and, at the end of the rounding operation, automatically returns the cutter head to its inoperative position. During the advancing movement of the cutter head into engagement with the shoe, the operator grasps a handle 34 on the cutter head and swings the latter heightwise to bring a crease guide 36 into the welt crease of the shoe, the upper surfaces of the guide and the above-mentioned anvil 16 being flush and adapted to bear against the welt of a welt shoe or the corresponding part of a shoe of any different construction. Now, the operator swings forwardly a leyer 38 (Fig. 3) which causes a bottom rest 40 to be lowered into engagement with the shoe bottom and to apply a yielding pressure thereto. Thus, the shoe is yieldingly gripped between the bottom rest and the crease guide 36 throughout the rounding operation, and the cutter head is swung vertically under the control of the bottom rest and crease guide in accordance with changes in the level of the sole at the point of operation of the cutter head upon it.

The illustrated structure constitutes the right-hand unit of the machine which also includes a similar left-hand unit, these units having been designed to operate upon right and left shoes, respectively. The left-hand unit has been omitted from the drawings but it is to be understood that this unit is the same as that illustrated, except for the symmetrical arrangement of some of its parts necessitated by the fact that all movements of the jack of the left-hand unit are opposite to the corresponding movements of the right-hand jack, in order that the rounding operation will be carried out in the same manner upon both shoes of a pair.

The rounding cut upon both right and left shoes is begun at the outside heel breast line, is advanced forwardly along the outer side of the shoe, then around the toe, then along the inner side of the shoe and finally around the heel, terminating at the starting point. This transfer of the point of operation of the cutter around the shoe is effected by combined oscillatory and rotary movements of the jack. The jack in the machine disclosed in the above-mentioned Stacey patent is subject to simultaneous swinging and rotary movements. However, the jack driving mechanism of the present machine, which forms a part of the subject matter disclosed and claimed in the above-mentioned Cleversey patent, imparts rotative and oscillatory movements to the jack which are materially different, individually, from those just referred to, and also have been combined in a different manner to improve the shoe following action of the cutter head, and the smoothness of the rounding cut, particularly in those zones, at each end of the shank portion of the shoe, where the control of the shoe is shifted between the crease guide 36 and a forepart gage 41 which is utilized to position the cutter head when the forepart and heel end portions of the shoe are rounded.

Figure 2:
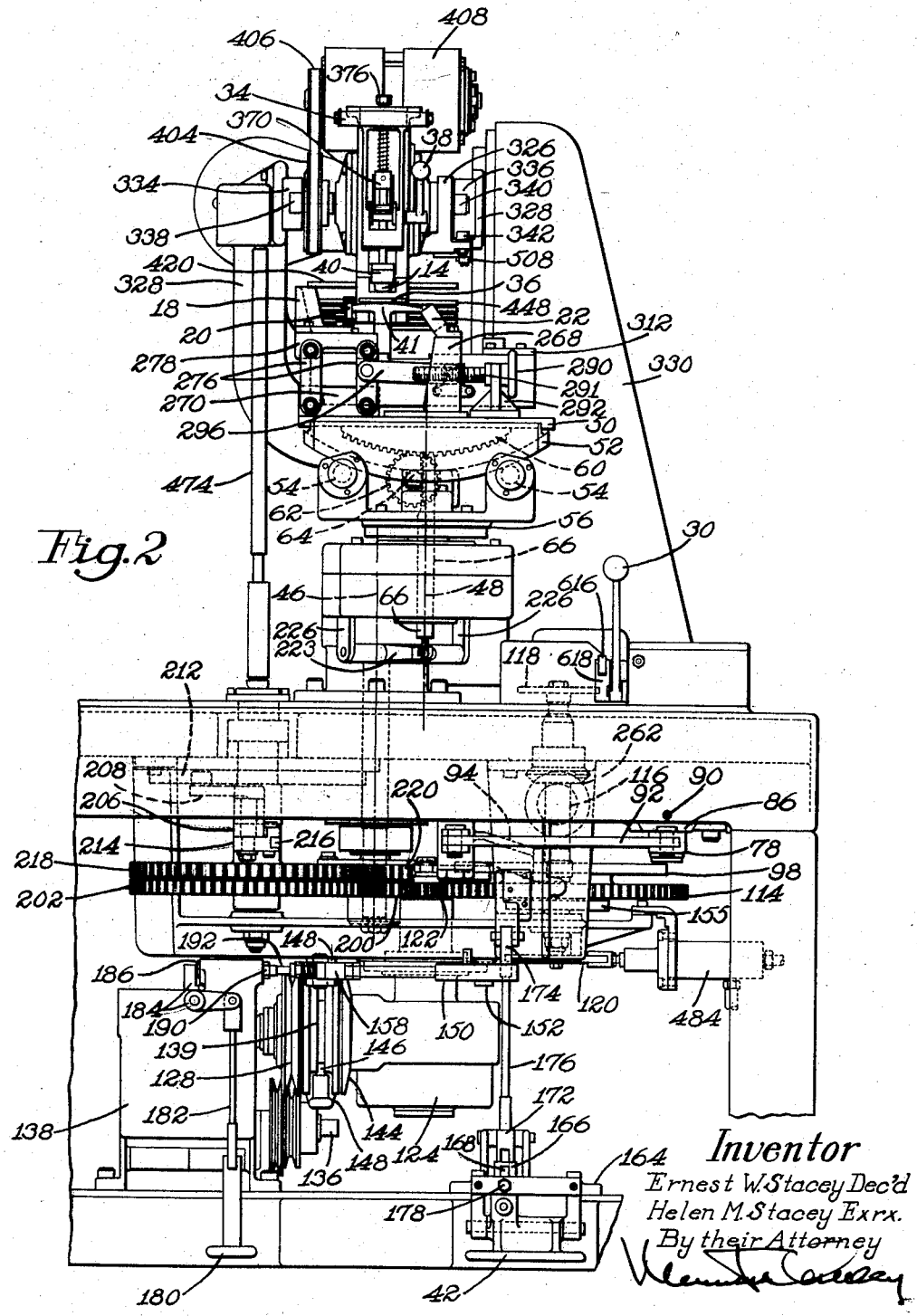
Fig. 2 is a front elevation showing the right hand unit of the machine.
Figure 11:
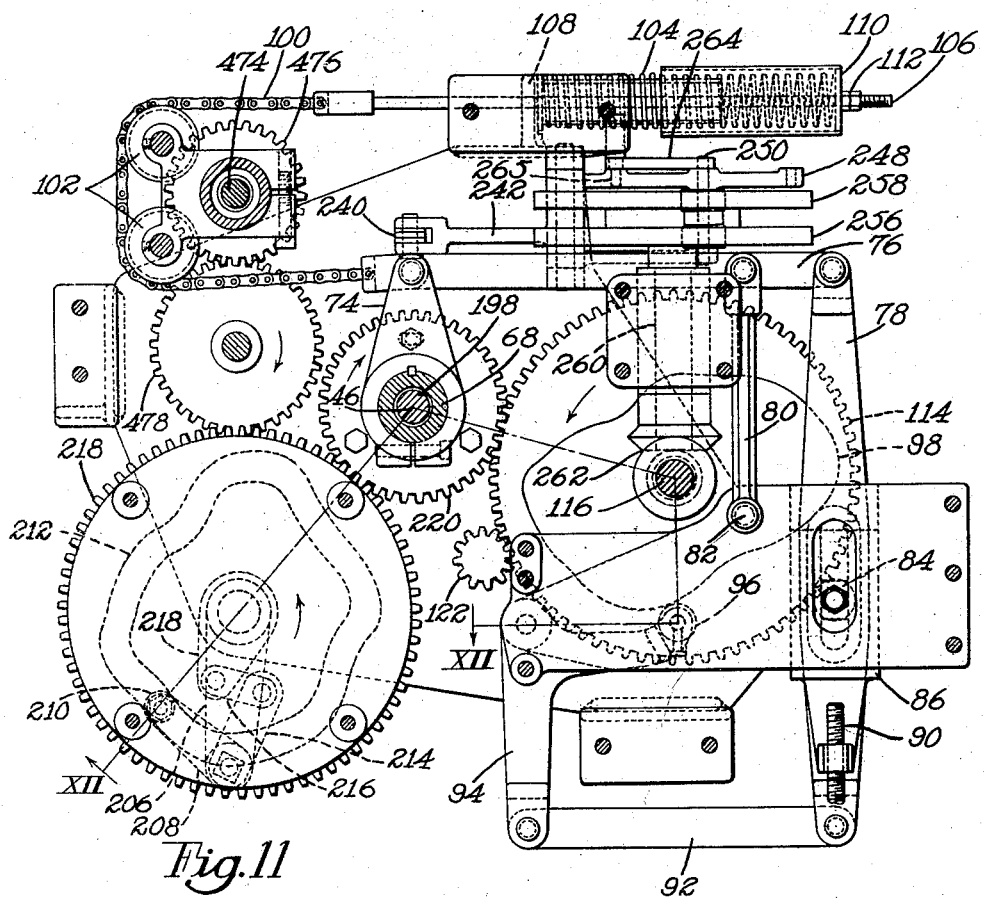
Fig. 11 is a sectional plan view of driving mechanism for the jack.
Figure 12:
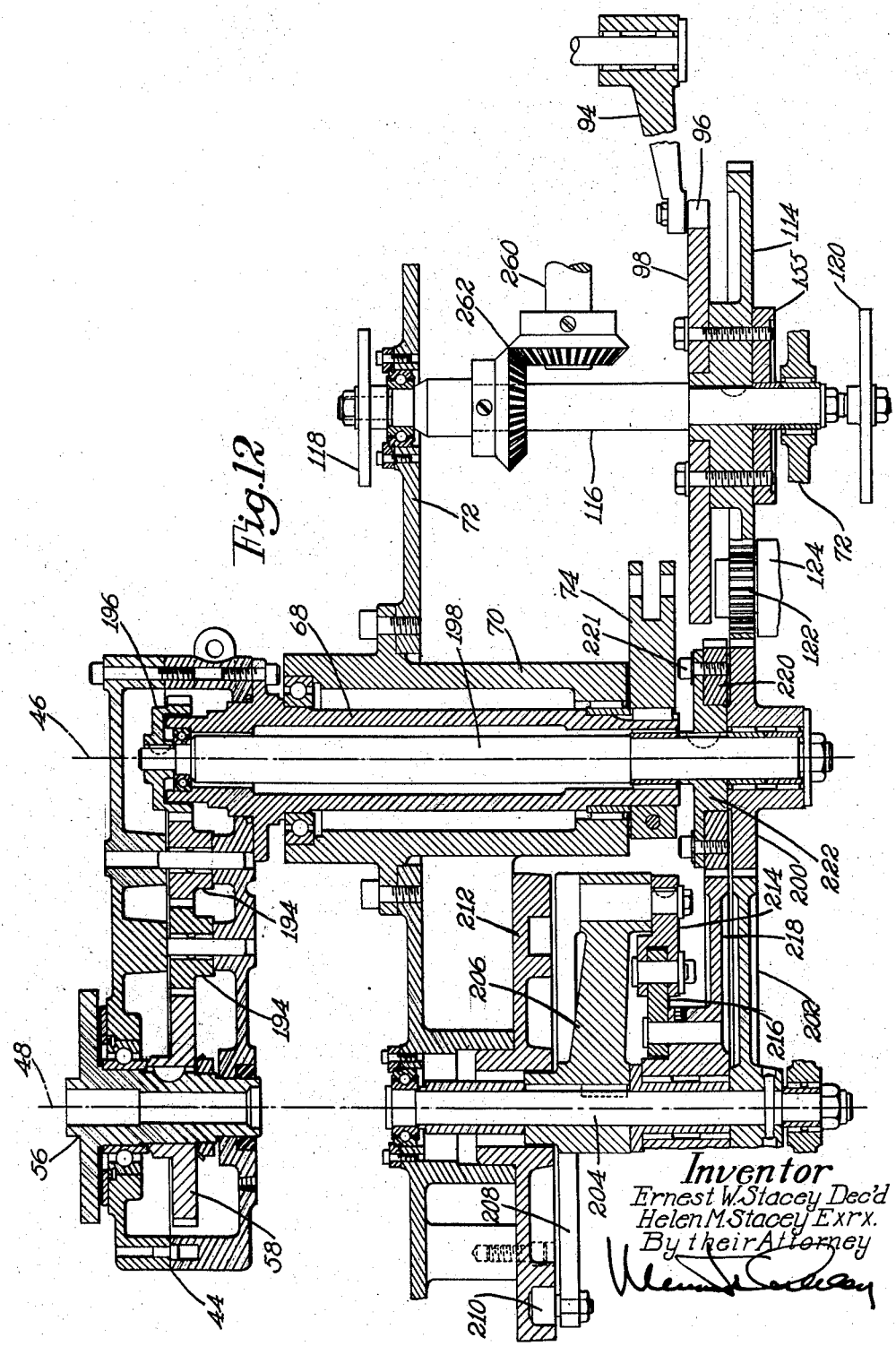
Fig. 12 is a sectional elevation of structure shown in Fig. 11, the section being taken along the broken line XII—XII of Fig. 11.

Referring now to the right-hand unit of the machine illustrated herein, after the cutter head 10 has been brought into operative relation to the shoe the operator depresses a treadle 42 to initiate a cycle of operation of mechanism for driving the jack. This drive mechanism imparts oscillations in opposite directions to a jack carrier 44 about a vertical axis at 46 (Figs. 11 and 12) the jack 12 being mounted to rotate upon the carrier about a vertical axis 48 (Figs. 1, 2, 12). During the first oscillation of the carrier, to the left in Fig. 2, the rounding cut is transferred from the outside heel breast line of the shoe to a point near the toe thereof. During the second oscillation of the carrier (to the right) the cut is transferred around the toe end of the shoe throughout that portion thereof which is of substantially uniform radius of curvature. During the third oscillation of the carrier (again to the left), the rounding cut is transferred from the toe end of the shoe along the inside thereof to the inner heel breast line and finally, during the fourth oscillation of the carrier (again to the right), the rounding cut is transferred around the uniformly curved portion of its heel to the starting point of the cut. Throughout these four oscillations of the jack, the shoe is rotated at a variable velocity counterclockwise except when the inner shank is operated upon, for a short period, the rotation of the jack upon the carrier is reversed, as described in the above-mentioned Cleversay patent and will be outlined later.

While the rounding cut is carried along the outer shank of the shoe the cutter head is positioned relatively to the shoe by the crease guide 36, which may be moved relatively to the knife in order to vary the sole edge extension, if desired. At the outer junction of the shank and forepart, the crease guide is ordinarily retracted from the side of the shoe, without being moved away from the welt, and the forepart gage 41 is advanced into the engagement with the side of the shoe, these movements of the gage and guide taking place simultaneously without permitting any lapse in the control of the shoe. As the rounding cut passes the inner junction of the shank and forepart, the forepart gage is retracted from the shoe and the crease guide is advanced toward the shoe to take over the control thereof which is continued until the rounding cut reaches the heel breast line. At this point, control of the shoe is returned to the forepart gage which is advanced into engagement with the shoe as the crease guide is backed slightly away from the shoe. When the cycle of operation of the jack is about to be terminated and the rounding cut approaches the outer heel breast line, the crease guide and forepart gage are again shifted to restore the control of the shoe to the crease guide in preparation for the next rounding cut which will be made along the outside shank of the shoe next to be operated upon.

As soon as a rounding cut has been completed, the jack driving mechanism is automatically disconnected from the source of power so that the jack is stopped in its original position and the fluid operated means 32 is automatically actuated to retract the cutter head into its inoperative position. Furthermore, in response to the return of the cutter head into its inoperative position the jack operating means 26 is actuated to advance the plunger 24 into engagement with the driving member 28 and to unclamp the lasted shoe on the jack.

Having broadly outlined the use and operation of the machine its structure will next be described in detail. The jack 12 has a base 50 (Figs. 1 and 2) upon which are mounted a pair of arcuate runners 52, 52 which are supported by a pair of rolls 54, 54 so as to permit such pitching movement to be imparted to the jack as is necessary to maintain the sole bottom level, notwithstanding its longitudinal curvature, at the point of operation of the cutter. The rolls are mounted upon a yoke 56 having a hollow shank which is rotatably mounted upon the forward end of the carrier 44 and has keyed thereto a gear 58 (Fig. 12). Pitching movement is imparted to the jack by connections comprising a gear segment 60 (Fig. 2) which is fixed to the base 50 and which meshes with a gear 62 rotatably mounted upon the yoke 56. Formed integral with this gear is a pinion 64 which meshes with a rack 66, the latter being mounted to slide vertically within the yoke 56 and operated by connections to be described later.

Figure 14:
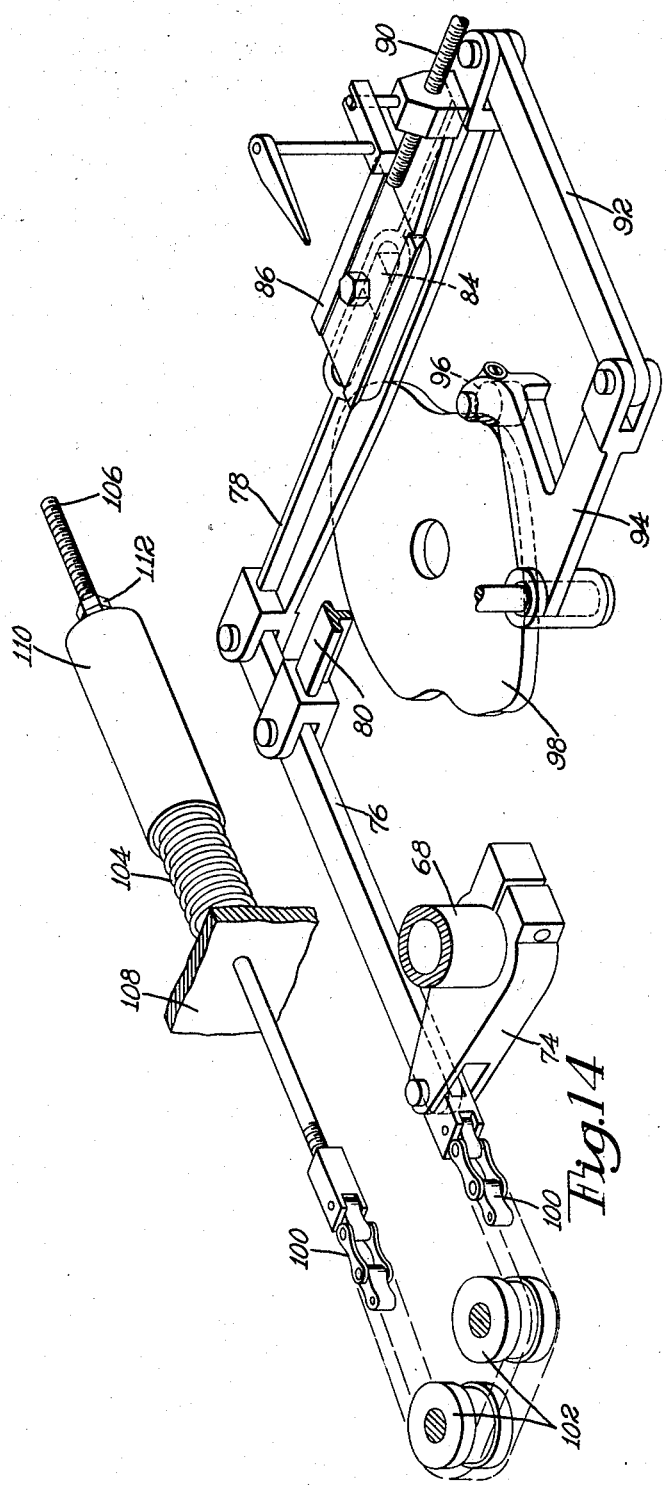
Fig. 14 is a perspective view of mechanism, illustrated in Fig. 11, for imparting a variable swinging movement to the jack.

The jack carrier 44 is fixed upon the upper end of a sleeve 68 (Fig. 12) which is mounted upon antifriction bearings in another sleeve 70 which is fixed to the frame 72 of the machine. Upon the lower end of the sleeve 68 is fixed an arm 74 which is operated through cam driven connections, next to be described, for imparting the above-mentioned oscillations to the jack. A link 76 (Figs. 11 and 14) pivoted at one end to the arm 74 and at its other end to a lever 78, is fulcrumed upon another link 80 which is pivoted upon the frame at 82. The lever 78 has an elongated slot arranged to receive a block 84 which is pivotally mounted upon a slide 86, the latter being mounted for adjustment on the frame 72 so as to vary the ratio of the arms of the lever 78. This adjustment is made to vary the amplitude of oscillation of the jack according to the length of the shoe to be operated upon, by turning a hand wheel 88 (Fig. 1) which is fixed upon a screw 90 (Figs. 11 and 14) rotatably mounted at the front of the machine and threaded into the slide 86. To the forward end of the lever 78 there is pivoted one end of a link 92 the other end of which is pivoted upon a bell crank 94 which is rotatably mounted upon the frame and carries a cam follower 96 which rolls upon a cam 98. When a rising slope on the cam 98 moves past the follower 96 the bell crank 94 is rotated clockwise and an oscillation in the same direction is imparted to the jack carrier 44. The carrier is moved in the opposite direction under the control of the cam 98, when a falling slope on it is presented to the follower 96, by connections comprising a chain 100 which is connected at one end to the link 76, runs over idler rolls 102 rotatably mounted on the frame, and is energized by a spring 104 which surrounds a rod 106 to which the chain 100 is connected. The spring 104 is compressed between a lug 108 formed integral with the frame and a tubular cap 110 the position of which may be varied lengthwise of the rod 106, to vary the compression of the spring, by adjusting check nuts 112 along the rod 106. It will now be evident from the shape of the cam 98 that during each revolution of the cam the carrier 44 will have four oscillations, the amplitude of which can be varied, to suit different sizes of shoes, by turning the hand wheel 88.

Figure 22:
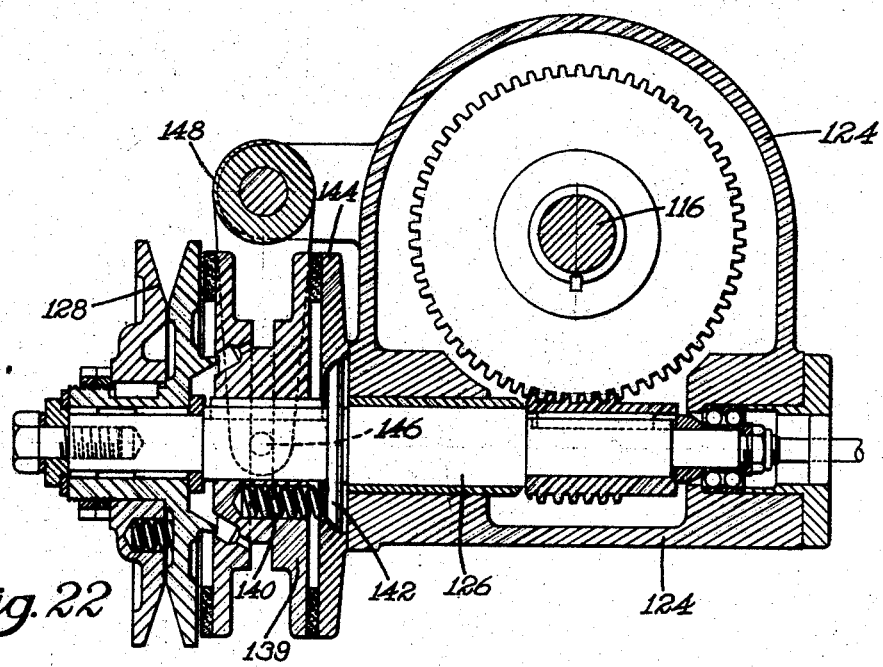
Fig. 22 is a sectional elevation of the clutch for the jack operating mechanism.

The above-mentioned cam 98 is fixed upon the hub of a gear 114 (Fig. 12) which is keyed to a shaft 116, the latter being rotatably mounted in the frame 72 and carrying upon its upper and lower ends a cutter head return cam 118 and cutter head pressure control cam 120, respectively, the purposes of which will be described later. A pinion 122, fixed upon the output shaft of a reduction gear unit 124 (Fig. 2, drives the gear 114, this unit having an input shaft 126 (Fig. 22) upon which is mounted for free rotation a driving pulley 128, the latter being driven by a motor 130 (Fig. 1) through connections comprising belts 132, 134 and a countershaft 136 carrying pulleys for the belts. A pump 137 (shown diagrammatically in Fig. 21) housed in a sump tank 138 (Figs. 2 and 21) for the fluid pressure system is directly connected to the countershaft 136. A frictional drive is provided between the pulley 128 and input shaft 126 by a clutch collar 139 (Fig. 22) which is splined to the shaft and is movable axially thereof into engagement with the pulley under the influence of a series of springs 140 which are housed within the collar and are compressed between it and a flange 142 formed integral with the shaft 126. By moving the clutch collar 139 away from the pulley 128 and into engagement with a braking flange 144, fixed to the frame of the unit 124, the drive is interrupted and the shaft 126 is stopped, as will presently be described.

Figure 16:
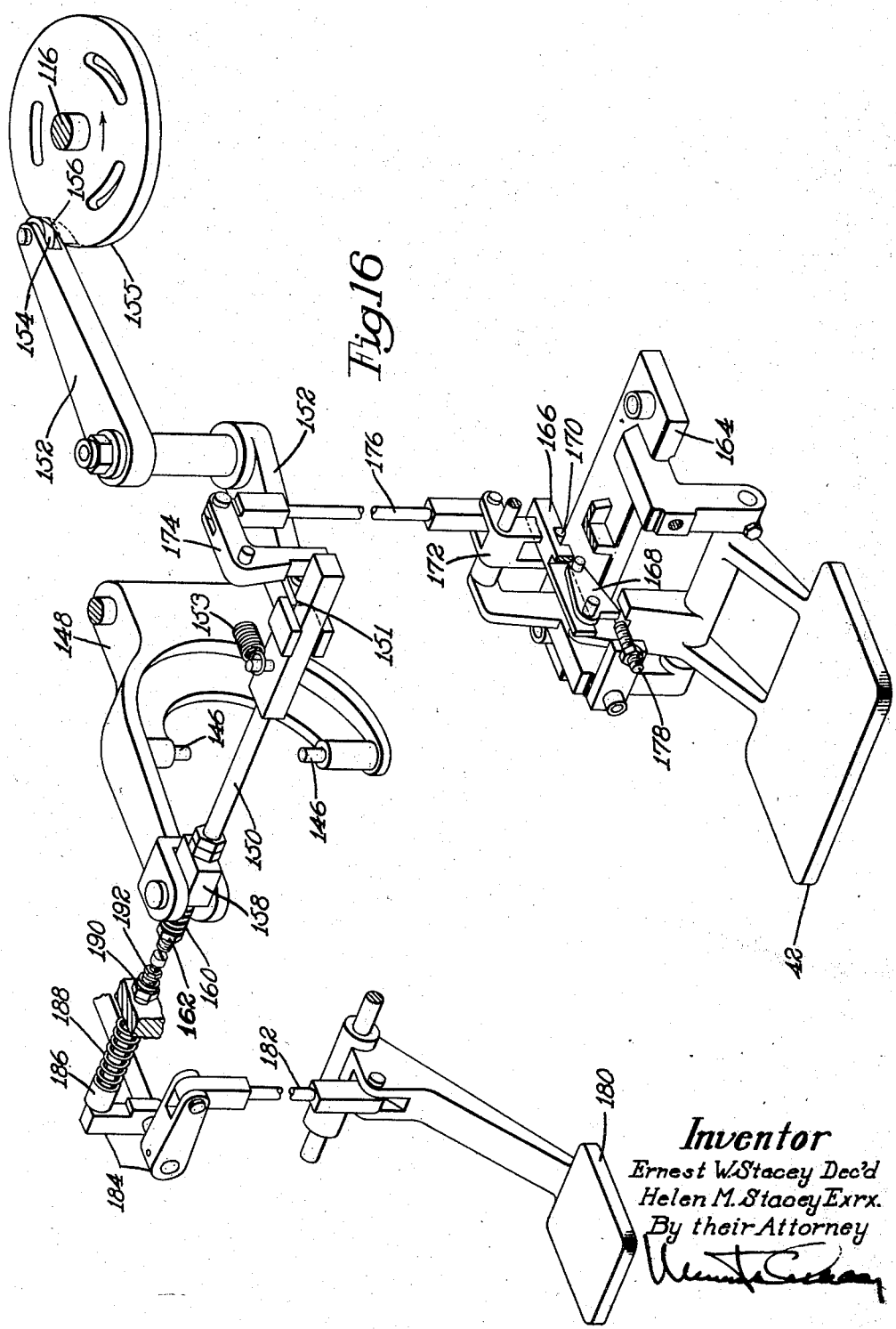
Fig. 16 is a perspective view of operator-controlled mechanism for controlling the operation of the jack driving mechanism.

Until a cycle of operation of the jack is to be started, the clutch collar 139 is held against the braking flange 144 by the following connections. A peripheral recess in the collar receives pins 146 (Fig. 16) carried by a yoke 148 which is pivotally mounted upon the frame for swinging movement so as to move the flange into engagement with either the pulley 128 or the braking flange. Connected, as will be described below, to the forward end of the yoke is a latch bar 150 having a notch 151 for receiving the forward end of one arm of a bell crank 152. A spring 153 stretched between the frame and the latch bar urges the bar against the forward arm of the bell crank. The other arm of the bell crank carries a roll follower 154 which runs upon a cycle control cam 155, the latter being fixed to the lower side of the gear 114, as shown in Fig. 12.

Before a cycle of operation of the jack driving means is started the roll 154 (Fig. 16) bears against a shoulder at the trailing end of a notch 156 in the cam 155 and the bell crank 152, acting through the latch bar 150, holds the yoke 148 to the right so as to produce the above-mentioned braking effect between the collar 139 and the flange 144. The latch bar 150 passes freely through a block 158 which is pivoted to the yoke 148 and a spring 160 is interposed between the block and a nut 162 threaded on the latch bar so that the yoke yieldingly holds the collar 139 against the braking flange 144. Depression of the treadle 42, when it is desired to start a cycle of operation of the jack, through the connections next to be described disengages the latch bar 150 from the bell crank 152, thereby permitting the clutch collar 139 to be moved into driving engagement with the pulley 128 by the springs 140.

The treadle 42, which is pivoted upon a bracket 164 fixed to the frame, has pivoted thereon a notched bar 166 and a trip 168. The notch in the bar 166 normally receives a pin 170 which is carried by the lower arm of a bell crank 172 pivoted upon the bracket 164, the other arm of the bell crank being connected to another bell crank 174 by a link 176. The bell crank 174 is pivoted upon the frame and is swung, when the treadle 42 is depressed, so as to move the latch bar 150 out of engagement with the bell crank 152, permitting driving engagement to be established between the pulley 128 and clutch collar 139, as described above. Toward the end of the downward movement of the treadle 42, the trip 168 engages a stop screw 178 which is fixed to the bracket 164 and causes the trip to swing the bar 166 upwardly out of driving engagement with the pin 170. Accordingly, the bell crank 174 is disconnected from the treadle so that the reengagement of the latch bar 150 with the bell crank 152 will take place at the end of an operating cycle even through the treadle is held down. At this time, when the roll 154 drops into the notch 156 of the cycle control cam 155 the bell crank 152 becomes alined with and seated in the notch 151 in the latch bar 150 and as the trailing rising slope of the notch 156 is presented to the roll 154, the latch bar 150 is pulled to the right, thereby causing the disengagement of the pulley 128 and clutch collar 139 and the engagement of the latter with the braking flange 144. Thus, the jack driving mechanism is stopped just before the roll 154 reaches the trailing end of the notch 156.

By depressing another treadle 180, the operator can stop the jack driving mechanism at any time during an operating cycle. This treadle is pivoted upon the frame and is connected by a link 182 to a bell crank 184 which is arranged to operate a push rod 186 mounted for sliding movement in the frame in alinement with the latch bar 150. The push rod is urged away from the latch bar by a spring 188 and its inoperative position can be varied by adjusting a nut 190 which is threaded on the rod and is adapted to bear against the frame. A screw 192 threaded into the push rod provides means for controlling, as desired, the operative relation between the push rod and the latch bar 150. If the treadle 180 is depressed far enough, the notch 151 in the latch bar becomes realined with and receives the bell crank 152 which will have been moved to the extreme of its counterclockwise rotation because the "high" concentric portion of the cycle control cam 155 is presented to the roll 154 except at the beginning and end of the cycle. With the latch bar 150 engaged with the bell crank 152 in this position, the yoke 148 firmly holds the clutch collar 139 against the braking flange 144. Once the latch bar 150 has been reengaged with the bell crank 152, the treadle 180 can be released without having any effect, but the operation of the machine may be resumed at any time by again depressing the treadle 42. The operating cycle can be thus interrupted as many times as desired without affecting the sequence of the various functions of the machine.

During each cycle of operation of the machine, in which the cam 98 makes one revolution, the jack is given four oscillations, one to the left, the next to the right, another to the left and the last one to the right. Also during each cycle, the jack is rotated counterclockwise, except for a short period when reversed clockwise rotation takes place, with respect to the carrier through one revolution, at a variable velocity, by the connections next to be described.

Figure 13:
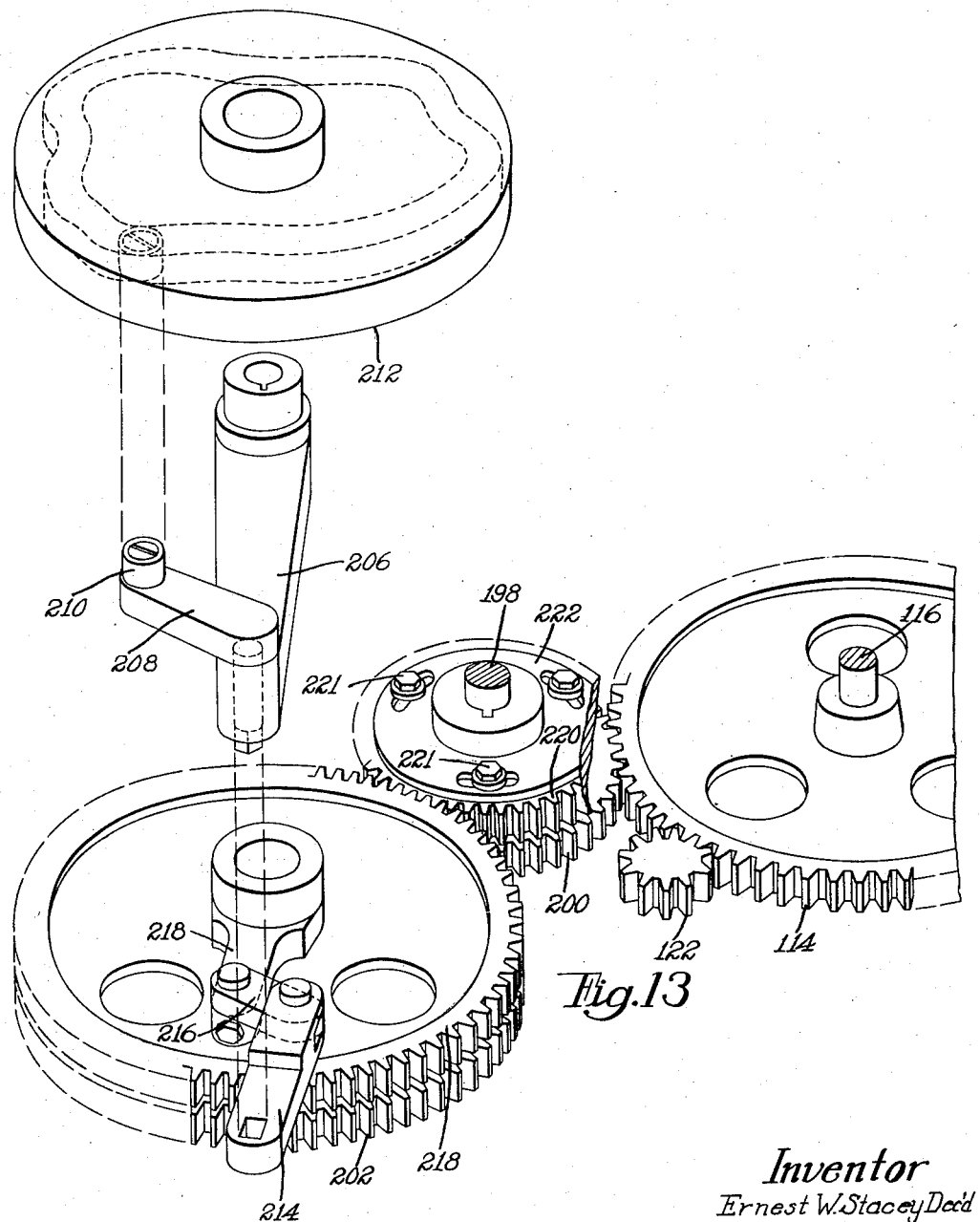
Fig. 13 is a perspective view of control mechanism shown in Figs. 11 and 12 for rotating the jack at a variable velocity.

The above-mentioned gear 58 (Fig. 12) is connected by idler gears 194, 194, rotatably mounted upon the jack carrier 44, with a pinion 196 which is keyed to the upper end of a shaft 198 which is mounted to rotate freely within the sleeve 68. A gear 200, mounted to rotate freely upon the lower end of the shaft 198, meshes with both the above-mentioned gear 114 and another gear 202 (Figs. 12 and 13) which is pinned to a shaft 204, the latter being mounted upon antifriction bearings for free rotation with respect to the frame. Upon an arm 206, keyed to the shaft 204, is rotatably mounted another arm 208 carrying at its outer end a cam roll 210 which runs in a track in a cam 212, the latter being fixed to the frame. There is fixed to the arm 208 another arm 214 which is connected by a link 216 to a gear 218, the latter being mounted coaxially with the gear 202 to rotate freely with respect to the shaft 204. The gear 218 meshes with a ring gear 220 into which are threaded screws 221 which pass through elongated slots in a flange 222 keyed to the shaft 198, so that the ring gear and flange may be rigidly held together with provision for limited angular adjustment. It will now be evident that, because of the control mechanism including the cam 212, the gear 218 will be accelerated or decelerated relatively to the gear 202 when the roll 210 traverses portions of the cam track of diminishing or increasing radius, respectively, and that corresponding accelerations and decelerations in the rotation of the jack relatively to the carrier will occur.

Through the above-mentioned gearing between the gear 218 and the jack, the latter receives a variable rotation relatively to the carrier 44, as is fully disclosed in the above mentioned Cleversey patent, for maintaining the desired relation between the work and the cutter head throughout the rounding operation. Briefly, the oscillatory movement of the carrier 44 combined with the rotary movement of the jack relatively to the carrier causes the feeding movement of the work to occur at all times in a direction tangent to the sole edge at the point of operation of the cutter thereupon. In order to preserve this relation between the work and the cutter head in the vicinity of the junction of the forepart and the inner shank, the above-mentioned control mechanism including the cam 212, is so designed as not only to decelerate the rotation of the jack relatively to the carrier but also to impart a reversed, clockwise rotation to the jack for a short period when the rounding cut passes the more sharply concave portion of the sole edge immediately to the rear of the inner ball line.

One effect of this combined oscillatory and rotative movement of the jack is to cause only the mid-portions of the crease guide 36, forepart gage 41 and cutter 14 to be presented to the work. Another effect of this movement of the jack is to eliminate any jamming tendency of the cutter head against the work as the cutter head is cammed by the work rearwardly, particularly when the toe and heel ends of the work are presented to the cutter head.

A further effect of this variable combined oscillatory and rotative movement of the jack is to improve the smoothness of the rounding cut. That is, the above-mentioned decelerations in the feeding movement of the work occur while its more abruptly curved portions at the toe and heel ends are presented to the cutter head. Similarly, other decelerations occur when the rounding cut passes the vicinity of the ball line at each side of the sole where the control of the shoe is shifted between the crease guide and the forepart gage. The periods of accelerated feeding movement, which occur between the above-mentioned decelerations, compensate for the latter so as to avoid undue prolongation of the rounding cycle.

Figure 15:
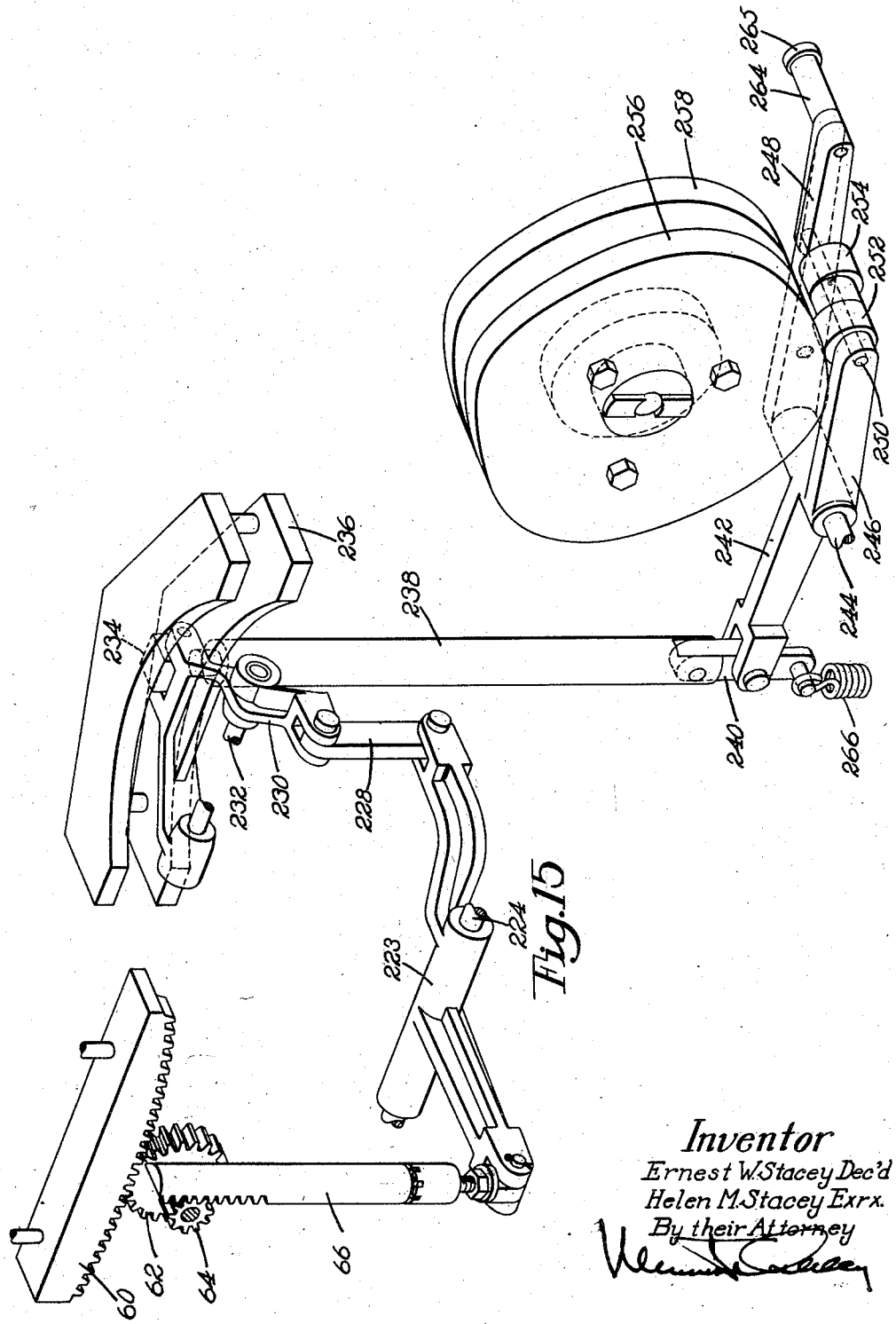
Fig. 15 is a view in perspective of mechanism, shown in Figs. 11 and 1, for imparting a pitching movement to the jack.

In addition to the rotative and swinging movements of the jack referred to above, it also has a pitching movement for the purpose of maintaining the bottom of the sole horizontal at the operating point of the cutter head upon it. The mechanism for imparting this pitching movement to the jack includes, with the above-mentioned gear segment 60 (Fig. 15) gear 62, pinion 64 and rack 66, other structure next to be described for imparting reciprocatory movements to the rack. The lower end of the rack 66 is pivoted to one arm of a lever 223 which is rotatably mounted upon a rod 224 carried by a pair of lugs 226 (Fig. 2) which project downwardly from the lower side of the jack carrier 44. The other arm of the lever 223 is connected by a link 228 (Fig. 15) to a bell crank 230 which is rotatably mounted upon a rod 232, the latter being fixed to the jack carrier at the rear thereof. The bell crank 230 carries a swivel block 234 which is freely received between opposed bearing surfaces of an arcuate yoke 236 which is shaped to afford continuous engagement with the swivel block throughout the swinging movement of the jack carrier. The yoke is fixed to the top of a rod 238 mounted to slide vertically in the frame and connected by a link 240 to a lever 242 which is mounted for swinging movement upon a rod 244 fixedly mounted upon the frame. The right-hand arm of the lever 242 consists of two members 246, 248 upon which there is rotatably mounted a shaft 250 having two eccentric portions upon which rolls 252, 254 are rotatably mounted so that the axes of the rolls are offset from the axis of the shaft 250 at opposite sides thereof. The rolls are mounted opposite to cams 256, 258 which are fixed upon a shaft 260 (Figs. 1 and 11) which is rotatably mounted in the frame and is driven by the above-mentioned shaft 116 through bevel gearing 262. The cams 256, 258 have different shapes, in order to accommodate different degrees of longitudinal curvature of the shoe bottom, and can be brought into use selectively by swinging a handle 264, which is fixed to the shaft 250, between its position illustrated in Fig. 15, when only the cam 256 is used, and a directly opposite position, illustrated in Fig. 11, in which the roll 252 is disengaged from the cam 256 and the roll 254 is brought into operative relation to the cam 258. The handle 264 is provided with a retractable locking pin 265 adapted to be received in holes in the member 248 so as to lock the handle in either of its operative positions. One or the other of the rolls 252, 254 is held against the associated cam by a spring 266 which is stretched between the link 240 and the frame.

Figure 18:
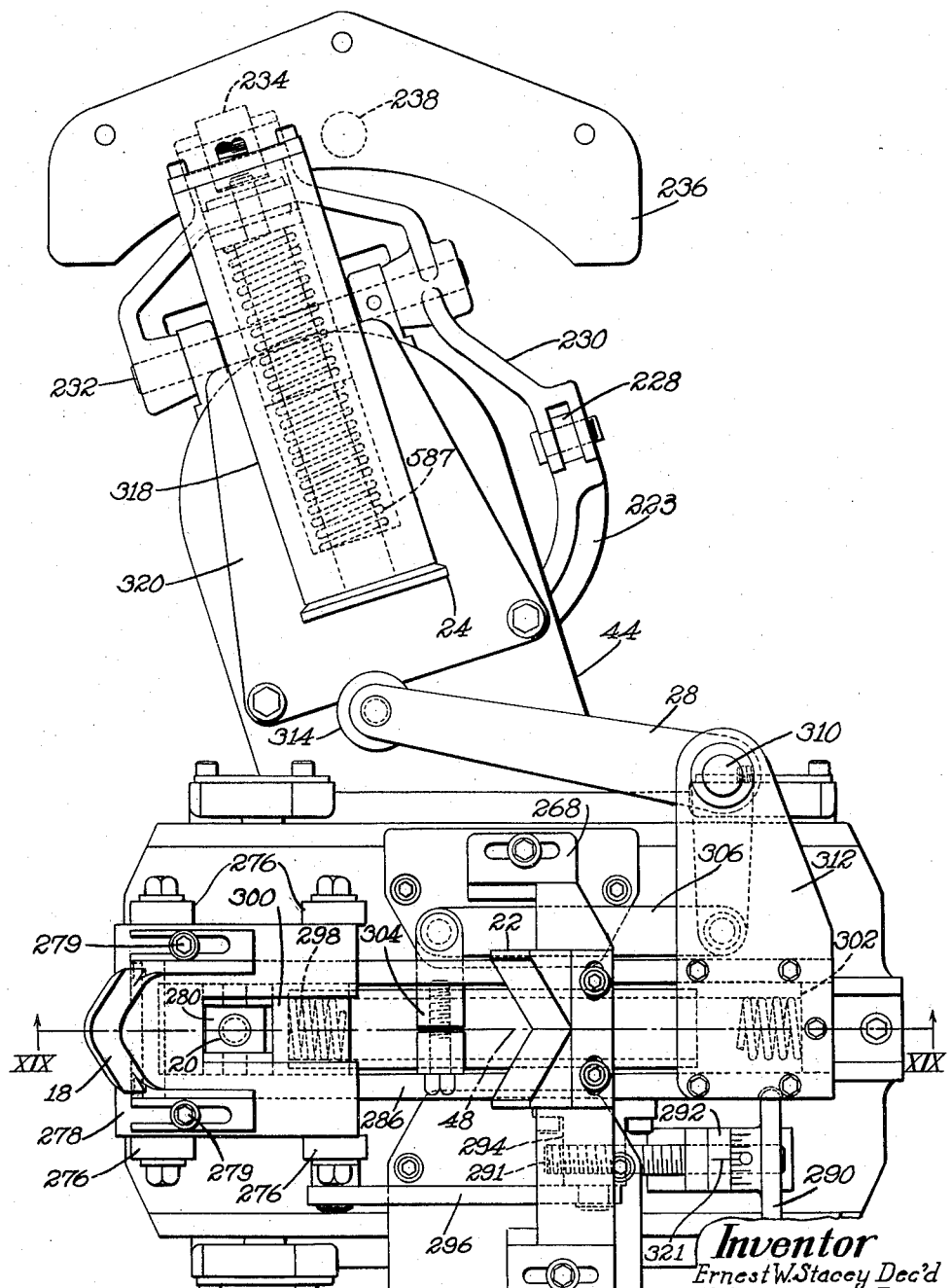
Fig. 18 is a plan view of the jack and operating mechanism therefor.

Referring now to the jack, the forepart rest 22 is secured to the top of a bracket 268 (Fig. 19) which is fixed to the base 50 in such a position that the forepart rest is engaged by the last adjacent to the axis of rotation 48 of the jack upon the carrier. Fixed upon the base 50 at its heel end are a channel 270 (Fig. 20) and a U-shaped guide 272, a similar guide 274 (Fig. 19) being fixed to the base at its opposite end. Parallel links 276, two on each side of the jack, are mounted at their lower ends to swing upon the channel 270. The upper ends of the links are pivotally connected to a U-shaped support 278 upon which the heel abutment 18 is mounted for adjustment lengthwise thereof and is secured by screws 279. The jack pin 20 is fixed upon a holder 280 which is pivoted at 282 upon a slide 284, the latter being mounted to slide freely in a set of grooved ways in a carriage 286. A second set of ways 288 in the lower part of the carriage receive the ends of the guides 272 and permit the carriage bodily to slide lengthwise of the base, independently of the heel abutment. The heel abutment 18 is adjusted toward and away from the forepart rest 22 by turning a hand wheel 290 (Fig. 18). The hand wheel is carried by a shaft 291 which is rotatably mounted upon a bracket 292 fixed to the base 50 and is threaded into a lug 294 protruding from one side of the carriage 286, the lug being connected to one of the parallel links 276 by a link 296. It will now be evident that as the heel abutment 18 is adjusted toward and away from the forepart rest, to accommodate lasts of different sizes, a corresponding movement will also be imparted to the carriage 286, for a purpose to be explained later. The parallel link mounting for the heel abutment 18 insures that, as the abutment is adjusted toward the forepart rest 22 to accommodate short lasts, the abutment is correspondingly lowered so as to avoid interference with any part of the cutter head 10.

Clamping pressure is imparted by the jack pin 20 to a last on the jack in response to the pressure of a spring 298 which is exerted upon the holder 284 by a slide 300 which encases the spring and runs in the upper ways of the carriage 286. The slide 300, at its rear end, telescopes within a bearing member 302 (Fig. 19) which is fixed upon the carriage 286. It will now be evident that the clamping pressure will be dependent upon the amount of compression to which the spring 298 is subjected and, furthermore, that by simultaneously adjusting the carriage 286 with the heel abutment 18 toward or away from the forepart rest 22, the compression of the spring is not affected and adjustments of the heel abutment will not cause changes in the clamping pressure.

The slide 300 is retracted from the holder 284, to remove the clamping pressure of the jack pin 20 upon the last, by connections comprising a clamp 304 (Fig. 18) which is fixed to the slide and joined by a link 306 to one arm of the driving member 28 which is rotatably mounted upon a rod 310, the latter being supported by a pair of plates 312 which are fixed to the carriage 286. The other arm of the driving member carries a roll 314 which is engaged by the plunger 24 of the fluid-operated jack operating means 26, the operation and control of which will be described later. The plunger 24 is mounted in a cylinder 318 to slide directly toward and away from the axis of rotation 48 of the jack upon the carrier, that is, in a direction intersecting the axis of the jack and extending transversely thereof. The cylinder 318 is fixed upon the upper end of a bracket 320 (Fig. 1) which is secured to the top of the jack carrier 44 and, as will more fully appear later, the plunger 24 is retracted into the cylinder to avoid interference with any part of the jack during its operating cycle and is both automatically advanced into operative relation to the driving member 28 and returned into its retracted position in response to movements of the cutter head 10 into and out of its inoperative position, respectively.

An analysis of the shape of the bottoms of many lasts of different sizes has shown that corresponding parts of their peripheral contours are subtended by the same angles taken about a vertical axis which passes through a point at or near the middle of the last bottom. The proper setting of the heel abutment 18, as indicated by an index 321 on the bracket 292 and calibrations on the hub of the hand wheel 290 representing different last sizes insures that the above-mentioned vertical axis of any last, regardless of its size, coincides with the axis of rotation of the jack. Also with the above consideration in view, the cam 98 for controlling the oscillation of the jack carrier 44, the means (84, 86, 88 and 90) for adjusting the amplitude of oscillation of the carrier according to the size of the shoe and the cam 212 for controlling the variable rotation of the jack upon the carrier have been designed, each with relation to the other, so as to obtain the desired direction of feeding movement as described above and to cause the shoe to be positioned with the sole edge at the operating point of the cutter head precisely normal to the direction of the shoe following movement of the cutter head toward and away from the jack. Thus, the proper placement of each last upon the jack in relation to its axis of rotation permits one set of the cams 98, 212 to provide a combined swinging and rotative movement of the jack which will effect both the desired feeding movement and the relation of normalcy between the sole edge and the shoe following movement of the cutter head at all points around the periphery of the sole edge, regardless of the size of the shoe being operated upon.

When the heel abutment 18 is adjusted for a medium size last, the corresponding adjustment of the carriage 286 causes the roll 314 on the driving crank 28 to be positioned in alinement with the axis of the plunger 24. Since the axis of the plunger intersects the axis of rotation of the jack there will in this case be no tendency for the pressure of the plunger 24 upon the roll 314 to rotate the jack. With other adjustments of the carriage, the roll 314 will be located slightly to the right or left of the axis of the plunger 24; but in any case this distance is so small that the pressure of the plunger 24 upon the roll 314 has a negligible jack turning effect.

The cutter head 10 has a frame 322 (Figs. 3, 5 and 6) which, near its rear end, is mounted to swing about a horizontal axis upon a shaft 324 which is fast upon a carriage 326. The carriage 326 is mounted to move freely horizontally toward and away from the jack upon a U-shaped slide 328 (Figs. 2 and 3) which is mounted for vertical adjustment upon a pedestal 330 (Figs. 1 and 2) fixed upon the frame. Vertical adjustment of the slide 328, for the purpose of bringing the cutter head to the desired level with respect to the work, is effected by turning a screw 332 (Fig. 1) which is threaded into the slide and bears at its lower end upon the base of the pedestal. The slide 328 comprises a pair of guideways 334, 336 (Figs. 2 and 6), the former of which has a groove for receiving a roll 338 rotatably mounted upon the left-hand side of the carriage 326. Similarly, a pair of rolls 340, 340, rotatably mounted upon the right-hand side of the carriage, are received in a groove in the guideway 336. This guideway has another groove in its bottom side for receiving another pair of rolls 342, 342 for preventing the carriage 326 from swinging in a horizontal plane. The carriage 326 is moved to and fro along the guideways 334, 336 by the above-mentioned fluid operated means 32 through connections comprising a link 344 (Figs. 1, 3 and 5) which is hinged to a bracket 346 fixed upon the carriage and is pivoted upon the upper end of one arm of a bell crank 348. This crank is mounted to swing in a vertical plane upon a stud 350 which is carried by a cylinder 352 fixed upon the rear side of the slide 328. The other arm of the bell crank is connected to a piston 354, the operation of which under fluid pressure within the cylinder 352 effects the advancing and retractive movements of the cutter head along the guideways 334, 336, toward and away from the shoe and holds the cutter head with a controlled variable pressure against the shoe, as will be described later, throughout the rounding operation.

The cutter head is counterbalanced by a spring 356 which is compressed between the upper end of the bracket 346 and a pair of check nuts 358 which are threaded upon a rod 360 to permit adjustment of the compression of the spring. The rod 360 is pivotally joined to a projection 362 extending upwardly from the cutter head frame 322. The adjustment of the nuts 358 is so made that the cutter head, if free from the shoe, rises above the shoe. This upward bias of the cutter head is an advantage in the rounding operation because the crease guide 36 and anvil 16 are pressed lightly against the welt.

In preparation for performing a rounding operation, the cutter head is advanced from its inoperative position, as illustrated in Fig. 1, toward the jack and is guided by the operator so as to cause the crease guide 36 and anvil 16 to engage the upper surface of the welt, the crease guide being seated in the welt crease and bearing against the side of the shoe upper. The above-mentioned lever 38 is now swung forwardly from its vertical inoperative position to permit the bottom rest 40 to press against the shoe bottom. The margin of the sole is thus held between elements of the cutter head which is swung heightwise upon the shaft 324 as the level of the sole at the point of operation of the cutter thereupon rises or falls.

The lever 38 is fixed to a shaft 364 (Fig. 3) which is rotatably mounted in the cutter head frame and carries a pair of links 366, the latter being joined at their upper ends to another pair of links 368, these two pairs of links constituting a toggle. The links 368 are pivotally connected to a collar 370 which is carried by a rod 372 upon the lower end of which the bottom rest 40 is mounted. The rod 372 is mounted upon the cutter head frame for free vertical sliding movement and is urged downwardly by a spring 374 which is compressed between the collar 370 and the cutter head frame. A nut 376 threaded on the upper end of the rod 372 limits the downward movement of the bottom rest. With the lever 38 in its inoperative position the toggle links 368, 366 are in their extended relation and the bottom rest is elevated into its inoperative position. However, when the lever 38 is swung forwardly, releasing the toggle links, the spring 374 bearing against the collar 370 causes the bottom rest yieldingly to engage the shoe bottom and to cause the margin of the sole to be yieldingly gripped between the bottom rest at one side and the crease guide and anvil at the other side.

The cutter 14 is arcuate in horizontal cross section being formed from a tube 378 (Fig. 4) which is clamped in a sleeve 380 by a split tapered bushing 382, the latter being threaded in the sleeve and locked thereto by a nut 384. The tube 378 is slotted near its upper end to receive a pin 386 which passes through the sleeve 380 and also a hollow plunger 388 in which the sleeve 380 is coaxially mounted. The cutting thrust of the cutter is resisted by a plug 390 which is threaded into the sleeve 380 for adjustment heightwise thereof and has a flange 392 which engages the upper end of the tube 378. Thus, by turning the plug the heightwise position of the cutter with respect to the plunger 388, and hence the relation of the cutter to the anvil, can be accurately controlled. The plunger 388 is mounted to reciprocate in the cutter head frame and is thus driven by connections comprising a link 394 (Fig. 3) which connects the plunger with a lever 396, the latter being pivoted at 398 upon the cutter head frame. This lever is joined by a connecting rod 400 with a crankshaft 402 which is rotatably mounted in the cutter head frame and carries upon its left hand end a pulley 404 (Fig. 2) which is driven by a belt 406 from an electric motor 408 mounted upon the cutter head frame.

There is formed in the anvil 16 near its outer end a narrow arcuate recess 410 (Fig. 7) shaped to receive the cutting edge of the cutter in shearing relation. Near the end of its cutting stroke, the cutter passes below the upper surface of the anvil in close proximity to a shoulder on the anvil at the forward side of the recess. The anvil 16 has a shank 412 which is received in a bore in the cutter head frame 322, permitting adjustment of the anvil into the above-described relation to the cutter 14. The anvil is secured to the frame 322 by setting up a set screw 414 (Fig. 3) which is threaded in the frame and bears against the shank 412.

At the beginning of a rounding operation, near the outer heel breast line of the shoe, the cutter head is under the guidance of the crease guide 36 which is seated in the welt crease with its upper surface engaging the welt and its forward end engaging the side of the upper close to the welt. As the rounding cut approaches the vicinity of the outer ball line the control of the cutter head is taken over by the forepart gage 41 which now is advanced from its inoperative position, as illustrated in Fig. 7, into its operative position, in engagement with the side of the shoe upper, as illustrated in Fig. 8. Simultaneously with this movement of the forepart gage into its operative position, the crease guide 36 is retracted away from the side of the shoe upper into its inoperative position as illustrated in Fig. 8 so that the crease guide no longer has any guiding function so far as determining the sole edge extension is concerned. However, the crease guide still cooperates with the anvil to furnish a table of considerable area for supporting the upper surface of the welt of the shoe. Another interchange of the forepart gage and crease guide occurs later, in the vicinity of the inner ball line where the control of the cutter head is taken over by the crease guide; and similar interchanges, if the heel part of the sole is to be rounded, occur at the inner heel breast line, where the control of the cutter head is shifted again to the forepart gage 41, and finally at the outer breast line, where the control of the cutter head is taken over by the crease guide again, in preparation for the rounding of the outside shank portion of the next shoe to be operated upon.

Figure 9:
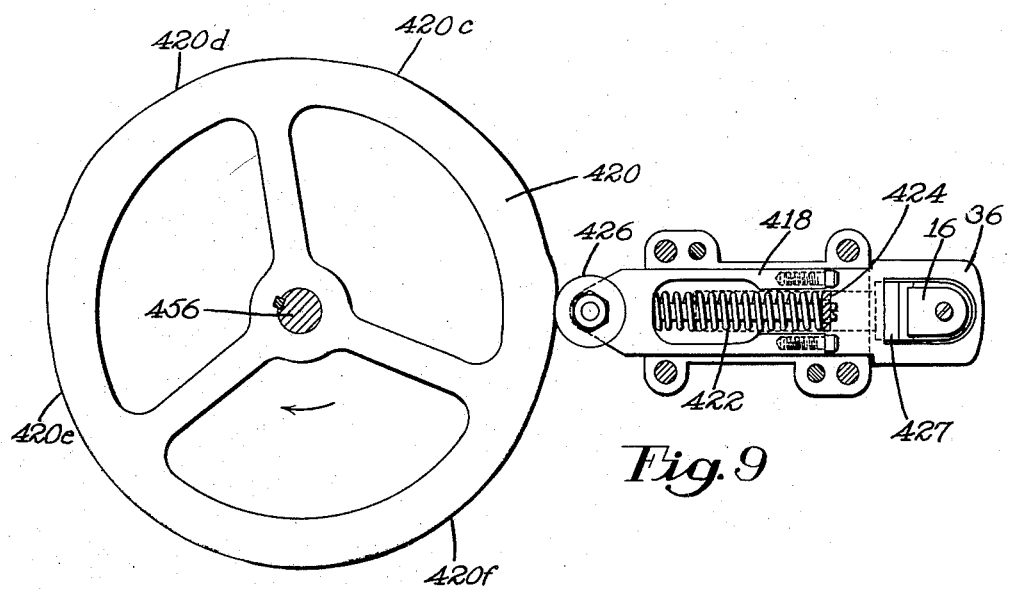
Fig. 9 is a sectional plan view of the anvil, the crease guide and controlling mechanism for the latter.

The crease guide 36 is formed upon the forward end of a slide 418 (Figs. 3 and 9) which is mounted in a recess in the cutter head frame freely to slide forwardly and rearwardly thereof under the control of a cam 420 which is rotated by connections, to be described later, through one revolution for each cycle of operation of the jack. A spring 422 compressed between a fixed lug 424 and the slide 418 urges the latter toward the cam 420 so as to hold a roll follower 426, mounted on the slide, always in engagement with the cam. Movement of the crease guide 36 between its operative and inoperative positions occurs without interference by the anvil 16 owing to the provision of an elongated recess 427 in the guide into which the anvil 16 projects with its upper surface flush with that of the guide.

The forepart gage 41 (Figs. 3 and 10) has a shank 428 which is freely rotatable in an arm 430 which is mounted to swing upon a stud 432 fixed upon a slide 434. This slide is mounted to move freely forwardly and rearwardly within the cutter head frame and is biased rearwardly thereof by a spring 436 which is compressed between the slide and a lug 438 integral with the cutter head frame. The arm 430 is yieldingly urged upwardly by a spring 440 compressed between the slide and the arm, the upper position of the latter being limited by a setscrew 442 which is threaded in the arm and adapted to engage the slide 434. Upon a shaft 444 mounted upon the rearward end of the slide 434 is rotatably mounted a roll follower 446 which is adjustable heightwise of the shaft 444 opposite to any one of a series of cams 448 which rotate with the above-mentioned cam 420. The roll follower 446 is supported opposite to the selected cam 448 by a clip 450 which is mounted to swing and slide axially on the shaft 444. The clip is biased clockwise by a spring 452 so as to hold a finger 453 on the clip within a recess 454 in the holder, there being a recess corresponding to each of the cams 448. The cams 448 have different shapes according to the different sole edge extensions required for shoes of different styles. Each cam has a "high" portion which, when presented to the roll 446, causes the forepart gage 41 to be held in its operative position; and the high portion of the cam may be of varying radius so as to cause a variation in the sole edge extension.

When a falling slope on the cam 448 passes the roll 446, the roll 446, the slide 434 and forepart gage 41 move rearwardly, and the gage is retracted from the shoe. With such rearward movement of the gage, it swings with the arm 430 about the stud 432 and slides down the lower side of the anvil 16. The forepart gage is thus moved far enough backward and downward from the shoe (as illustrated in Fig. 7) so as not to interfere with the guidance of the cutter head by the crease guide. When a rising slope on the cam 448 is presented to the roll 446, the slide 434 is moved forwardly to bring the forepart gage into engagement with the shoe (as the crease guide 36 is retracted therefrom), the forepart gage now sliding obliquely upwardly in engagement with the lower side of the anvil until the set screw 442 engages the bottom of the slide. Thereafter, with further forward movement of the slide, the forepart gage advances at the same level into its operative position as illustrated in Fig. 8. The forepart gage 41, as viewed in plan, is slightly concave so that in passing the junction of the toe cap and vamp of a shoe the gage will bridge across the jog between these parts of the shoe and thereby avoid imparting a sudden movement to the cutter head at that point. The smoothing action of the forepart gage is furthered by the fact that because it is pivotally mounted upon the arm 430, only a half of whatever displacement the leading end of the gage has is imparted to the arm 430.

Figure 10:
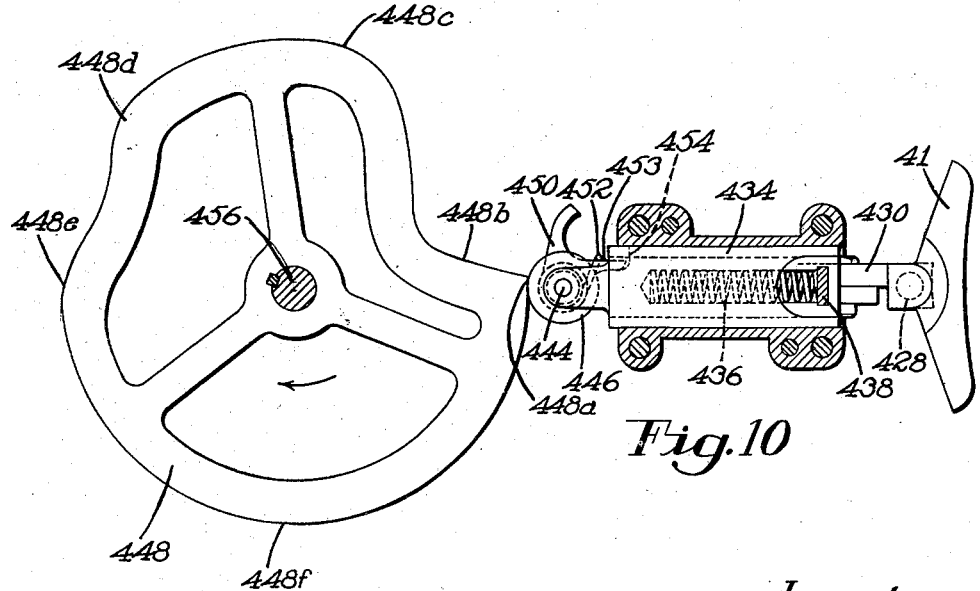
Fig. 10 is a view similar to Fig. 9 showing the forepart gage and its controlling mechanism.

In Fig. 10 there is illustrated the relation between the cam 448 and the follower 446 when the guidance of the shoe is being taken over by the crease guide from the forepart gage at the inner ball line. At this time, a slightly rising slope on the cam 448, terminating at 448a, will have been presented to the roll 446 to impart a gradually increasing extension to the sole edge as the rounding cut approaches the inner ball line. Similarly, a more pronounced rising slope on the cam 420 will also have been presented to the roll 426, associated with the crease guide, so as to advance the crease guide into engagement with the shoe. The control of the shoe by the crease guide is now maintained until the end (at 420c) of the succeeding falling slope of the cam 420 reaches the roll 426.

During this period, in which the work is under the control of the crease guide, the corner 448a of the cam 448 passes the roll 446 and the falling slope 448b on the cam permits the forepart gage to move abruptly away from and out of the path of the shoe. As the operating point of the cutter approaches the inside heel breast line, the succeeding rising slope on the cam 48, which terminates at 448c, advances the forepart gage into its operative position at about the time when point 448c is presented to the roll 446. From this time on a "high" portion of the cam 448 is presented to the roll 446, while the uniformly curved heel end of the sole is being rounded under the control of the forepart gage. During this period a "low" portion of the cam 420, between the points 420c and 420d, is presented to the roll 426 whereby the crease guide is held in its inoperative position. When the points 448d and 420d on the cam reach the rolls 446, 426, respectively, the rounding cut will have been transferred around the heel end of the shoe to a point slightly to the rear of the outer heel breast line. Now a "high" portion of the cam 420, terminating at 420e, is presented to the roll 426 causing the crease guide to be advanced into its operative position. In the same period, a low portion of the cam 448, terminating at 448e, causes the forepart gage to be retracted from the work immediately after the point 448d passes the roll 446. The control of the shoe is thus shifted to the crease guide and such control is maintained until the arrival of the point 448e on the cam 448 at the roll 446, when the rounding cut will have been carried into the vicinity of the outer ball line. The crease guide is now retracted from the shoe upper because a "low" portion of the cam 420 extending from 420e to 420f is being presented to the roll 426. The radius of the cam 448 will ordinarily diminish from the point 448e to a minimum at about 448f which is presented to the roll 446 when the rounding cut passes the toe end of the shoe, and this change in the radius of the cam is made according to the desired "Baltimore" effect for which the cam is designed. Beyond the point 448f the radius of the cam again increases to provide a gradually increasing sole edge extension at the inner side of the forepart as the inner ball line is approached. However, as the terminal portion of the rising slope of the cam 448, which ends at 448a, is presented to the roll 446 a rising slope on the cam 420, beginning at 420f, is presented to the roll 426 and causes the crease guide 36 to be advanced into engagement with the shoe just before the falling slope 448b on the cam 448 is presented to the roll 446. Thus, the control of the shoe by the crease guide is again resumed for the inside shank portion of the rounding cut.

All the cams 420, 448 are keyed upon a shaft 456 (Figs. 3 and 5) which is rotatably mounted in the frame 322 and has pinned thereto at its upper end a worm gear 458. This gear is driven by a worm 460 fixed upon a shaft 461 which is rotatably mounted in the frame 322 and is connected by a universal joint 462 to a splined shaft 464. The shaft 464 slides freely within a splined bore in a pinion 466 which is rotatably mounted upon the slide 328 in mesh with a gear 468 fixed upon the rear end of a shaft 470 which also is rotatably mounted in the slide. This latter shaft is connected by bevel gearing 472 to a telescoping shaft 474 upon the lower end of which a gear 476 (Fig. 11) is mounted. The gear 476 meshes with an idler gear 478 which is rotatably mounted upon the frame 72 in meshing relation with the above-mentioned gear 202. Through the above-described connections, the cams 420, 448 are rotated at a constant velocity through one revolution for each cycle of operation of the jack. The universal joint 462, the center of which is coaxial with the shaft 324, permits the cutter head to rise and fall, according to variations in the level of the sole at the operating point of the cutter, without affecting the drive for the cams. Similarly, the splined joint between the shaft 464 and the pinion 466 permits forward and rearward shoe following movement of the cutter head to occur without affecting the drive for the cams.

Figure 17:
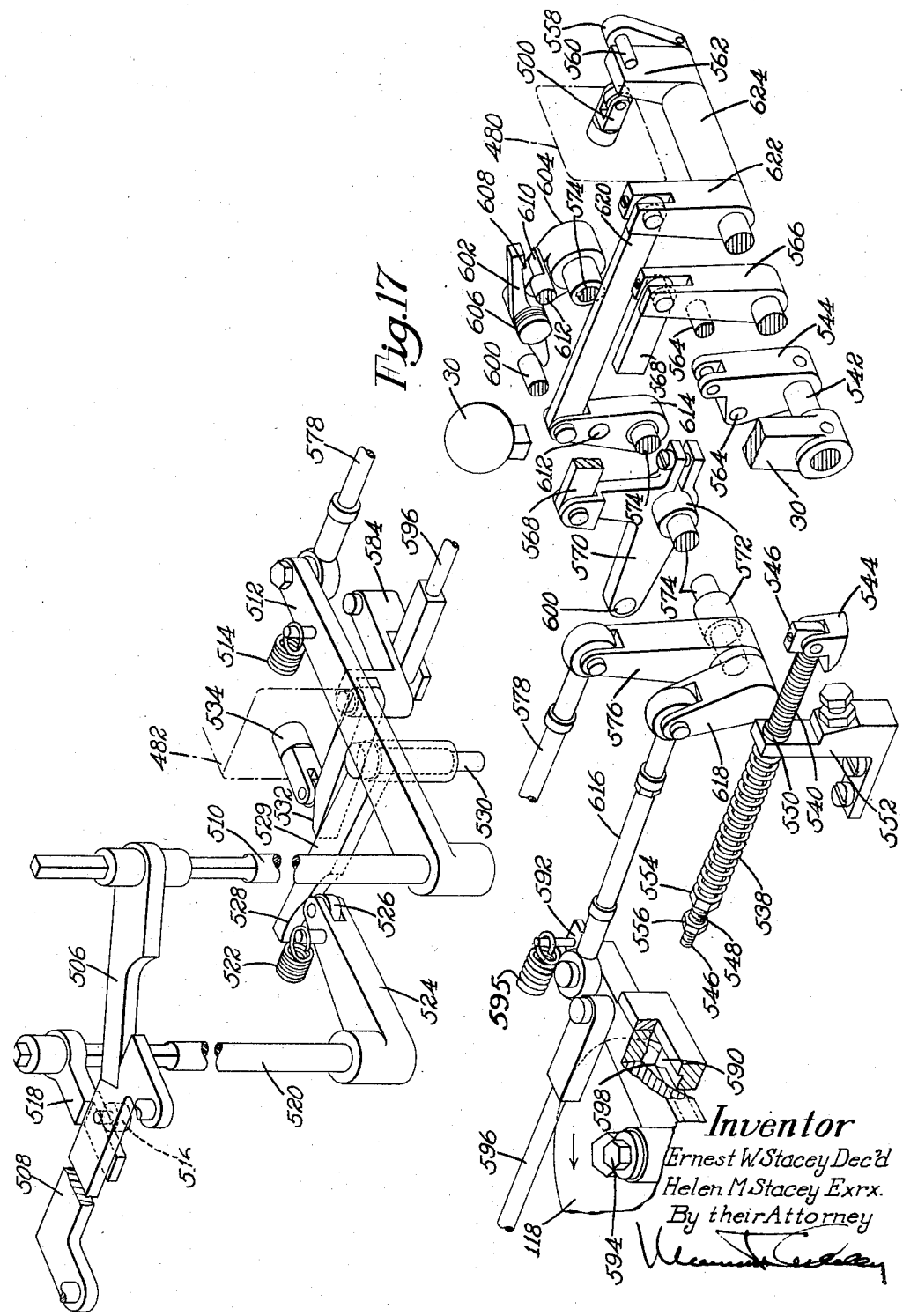
Fig. 17 is an exploded perspective view of mechanism for controlling the advancing and retracting movements of the tool head into and out of operative position, respectively.

The fluid system of the illustrated machine includes, in addition to elements of the jack operating means 26 and the cutter head operating means 32, the pump 137 and sump tank 138, already referred to above, the following principal elements: a valve 480 (Figs. 21 and 17) for controlling the cutter head operating means, a valve 482 for controlling the jack operating means, and a variable relief valve 484 (Figs. 21 and 2) for controlling the fluid pressure applied to the valve 480 and cutter head operating means, these elements of the fluid system being connected by various pipes, as will be described in detail below. A pipe 490 (Fig. 21) conducts oil from the sump 138 to the pump 137 which delivers the oil under pressure through a pipe 492 one branch of which leads to the valve 484. Other branches of this pipe conduct oil to inlet ports 496, 498 in the valves 482, 480, respectively. The valve 480 comprises a plunger 500 which is biased by a spring 502 toward its normal "out" position, as illustrated in Fig. 21. In this setting of the valve 480, the oil passes therefrom into a pipe 504 which is connected to the upper end of the cylinder 352. Hence, fluid pressure is exerted downwardly upon the piston 354 which tends to swing the lever 348 so as to advance the cutter head toward the jack. However, when the cutter head is in its retracted inoperative position, it is normally locked therein by a latch 506 (Figs. 1 and 17) which is seated in a notch in a plate 508 (Figs. 5 and 17) fixed upon the lower right hand side of the carriage 326. The latch is mounted to swing upon the slide 328 and slidingly receives the upper squared portion of a shaft 510 (Figs. 1 and 17) the lower end of which is rotatably mounted upon the pedestal 330 and has fixed thereto an arm 512 which is biased rearwardly of the machine by a spring 514 stretched between the arm and the pedestal. Thus, the latch 506 is always urged toward the plate 508 and normally cooperates with the plate to hold the cutter head in its retracted position.

Under the same conditions, the following connections set the valve 482 so as to cause the plunger 24 of the jack operating means 26 to act upon the jack operating member 28 so as to remove clamping pressure from the jack pin. A roll 516 (Figs. 17 and 5), mounted upon the lower side of the plate 508, engages an arm 518 which is rotatably mounted upon the slide 328 and slidably receives the upper squared end of a shaft 520 the lower end of which is rotatably mounted upon the pedestal 330. The arm 518 is biased toward the roll 516 by a spring 522 which is stretched between the pedestal and an arm 524 which is fixed upon the lower end of the shaft 520. A roll 526 mounted upon the end of the arm 524 runs along a cam surface 528 formed upon one side of an arm 529 mounted to swing upon a stud 530 which is fixed to the frame. The other side of the arm 529 is engaged by a safety finger 532 which engages a plunger 534 of the valve 482, the plunger thus being held in its "in" position when the cutter head is in its retracted position. With the valve 482 in this setting, fluid pressure is conducted out of the valve through a pipe 536 (Fig. 21) to the cylinder 318 forcing the plunger 24 forwardly. Accordingly, when the cutter head is in its inoperative, retracted position a lasted shoe may be freely placed upon or removed from the jack.

The control lever 30 normally stands in a vertical, neutral position in which it is yieldingly held by two springs 538, 540 (Fig. 17) which act in opposition to each other. The control lever is fixed to a shaft 542 which is rotatably mounted on the forward side of the frame and to which is pinned an arm 544 having pivotally connected thereto at its upper end a rod 546. This rod slides within a tube 548 having integral with its forward end a collar 550 arranged to seat upon the forward side of a bracket 552 which is fixed to the frame. The spring 538, coiled about the tube and compressed between the rear side of the bracket and a nut 554 threaded upon the rear end of the tube, holds the collar 550 against the bracket. The spring 540 is coiled about the rod 546 between a shoulder on the forward end of the rod and the collar 550, the compression of the spring and the neutral position of the starting lever 30 being adjustable by turning a nut 556 which is threaded upon the rear end of the rod 546 and is adapted to abut the rear end of the tube 548. Upon the right hand end of the shaft 542 there is pinned an arm 558 carrying a pin 560 which overlies an arm 562, the latter being opposite to the plunger 500 of the valve 480 and freely rotatable with respect to the shaft 542. The above-mentioned adjustment of the nut 556 upon the rod 546 will be so made that the arm 562 will be brought into close proximity to the forward end of the plunger 500 when the latter is in its "out" position. Through the control mechanism, next to be described in detail, movement of the control lever 30 forwardly from its neutral position releases the cutter head for advancing movement into operative relation with respect to a jacked shoe and movement of the control lever rearwardly of its neutral position, at any time, will cause the return of the cutter head into its inoperative position. Moreover, the control mechanism is also so related to the driving means for the jack that, once the operator has caused the cutter head to be advanced into its operative position in engagement with the shoe and has started a cycle of operation of the jack driving means, the cutter head will be automatically returned to its inoperative position at the completion of the operating cycle of the jack driving means.

When the operator pulls the control lever 30 forward, a pin 564 fixed to the arm 544 engages and swings forwardly an arm 566 which is freely rotatable upon the shaft 542. A link 568 connects the upper end of the arm 566 with a bell crank 570 which is fixed to a sleeve 572, the latter being rotatably mounted upon a shaft 574 which is rotatably mounted in the frame. Fixed to the sleeve 572, and hence effectually integral with the bell crank 570, is an arm 576 the upper end of which is connected by a link 578 to the above-mentioned arm 512 associated with the latch 506 for holding the cutter head in its retracted position. Accordingly, forward movement of the control lever 30, through the connections just described, disengages the latch 506 from the plate 508, permitting the cutter head to advance toward the shoe under the force of the fluid pressure already being applied to the top of the piston 354. Forward movement of the control lever has no effect upon the valve 480 since the pin 560 on the arm 558 merely moves away from the arm 562 at this time.

The cutter head is advanced toward the shoe with a moderate speed and force in response to a light fluid pressure established by the relief valve 484 (Figs. 21 and 2) which is under the control of the cam 120. The valve 484 comprises a plunger 582 which bleeds more or less fluid from the pipe 492 to vary the pressure therein, and this fluid is conducted by one branch of a pipe 583 to the sump 138. The plunger is moved axially by the cam 120 into different positions for different stages of the rounding operation, as will be described later.

Immediately upon the movement of the cutter head away from its inoperative position, the roll 516 (Fig. 17) on the plate 508 permits the arm 518 and hence the shaft 520 and arm 524 to swing counterclockwise under the impulse of the spring 522. The roll 526 on the arm 524 now moves down the falling slope of the cam surface 528 on the arm 529, permitting the latter to swing counterclockwise on its stud 530. The safety finger 532, which is pivotally mounted upon a lever 584 fulcrumed on the frame, follows the arm 529, in response to pressure exerted by the outwardly biased plunger 534 of the valve 482. This valve is thus set in its "out" position, causing fluid pressure to be cut off from the jack operating means 26, and permitting the exhaust of fluid therefrom through the pipe 536, an outlet port 586 in the valve and another branch of the pipe 583 to the sump 138. The jack operating plunger 24 is immediately retracted by a spring 587 compressed between the plunger 24 and cylinder 318; and well before the cutter head reaches the shoe on the jack, the shoe is fully clamped upon the jack in response to the pressure of the spring 298.

As the cutter head advances toward the shoe, the operator, by holding the handle 34, will guide the cutter head at the proper level into its operative relation to the shoe with the upper surfaces of the crease guide 36 and anvil 16 flush with the upper surface of the welt, and the end of the crease guide bearing against the shoe upper. The lever 38 is now swung forwardly to bring the bottom rest yieldingly into engagement with the shoe bottom and to cause the margin of the sole to be yieldingly clamped by the bottom rest 40 at one side and by the anvil 16 and crease guide 36 at the other side. The operator exerts no further control upon the cutter head from this time on during the remainder of a cycle of operation of the machine.

A cycle of operation of the jack and the rounding operation are initiated by depressing the treadle 42 to engage the clutch collar 139 with the pulley 128. The jack driving means now goes through one cycle of operation causing the jack to be simultaneously swung and rotated to present the entire periphery of the shoe progressively to the cutter head. At the beginning of the cycle, the safety finger 532 (Fig. 17) is retracted from between the valve plunger 534 and the arm 529 by connections which are under the control of the above-mentioned cutter head return cam 118 (Figs. 17 and 12) which is fixed upon the top of the shaft 116. These connections comprise a cam follower 590 which is mounted upon a lever 592, the latter being fulcrumed upon a stud 594 which is fixed to the frame and also being biased rearwardly by a spring 595 for holding the follower 590 against the cam 118. A link 596 connects the lever 592 with the above-mentioned lever 584 upon which the safety finger 532 is pivoted. The cam 118 is rotated counterclockwise through one revolution during each cycle of the jack operating means and is notched at 598 so as to present a rising slope to the cam follower 590 at the beginning of each of its revolutions. At this time the safety finger 532 is withdrawn from the valve plunger 534, and throughout the remainder of the operating cycle of the driving means the finger is held retracted so that the valve 482 cannot be reset in its "in" position (which would cause the plunger 24 of the jack operating means to be advanced so as to interfere with the jack) if the operator, for any reason, should return the cutter head to its inoperative position before the operating cycle of the jack is completed.

When the lever 592 is swung forwardly by the rising slope on the cam 118, other parts of the control mechanism, later to be described, are set and actuated so that at the end of the revolution of the cam 118, when the follower 590 falls into the notch 598, allowing the lever 592 to swing rearwardly, the plunger 500 of the valve 480 is moved to its "in" position and the cutter head is automatically returned to its inoperative position. This rearward movement of the lever 592, through the link 596 and lever 584 causes the safety finger 532 to be interposed again between the valve plunger 534 and the arm 529. Accordingly, when the cutter head moves into its inoperative position and causes the roll 526 on the arm 524 to be moved up the rising slope of the cam surface 528, the valve plunger 534 is moved to its "in" position. Thus, the plunger 24 of the jack operating means is caused to operate the driving member 28 of the jack so as to unclamp the lasted shoe thereon.

The parts of the control mechanism for operating the valve plunger 500 to return the cutter head to its inoperative position and then for releasing the valve plunger 500 for movement into its "out" position will next be described. Once the latch 506 has been disengaged from the notch in the plate 508, in response to forward movement of the control lever 30, and the cutter head has moved forwardly out of its inoperative position, the latch bears against the side of the plate 508 in such a position as to cause a rod 600, fixed to the bell crank 570, to be held away from the tail of a latch 602 which is pivotally mounted upon an arm 604, the latter being keyed to the abovementioned shaft 574. The latch 602 is biased by a spring 606 so that a hook 608 on the forward end of the latch engages a land 610 on a rod 612 carried by an arm 614, the latter being rotatably mounted upon the shaft 574. At the beginning of a revolution of the cam 118, when the rising slope thereon causes the lever 592 to swing forwardly, through a link 616 connecting the lever with an arm 618 fixed upon the left-hand end of the shaft 574, the arm 604, and with it the latch 602, are swung far enough to permit the hook 608 to slide over the forward edge of the land 610, such movement of the latch being permitted because the rod 600 is still held above the tail of the latch. At the end of a revolution of the cam 118, when the follower 590 falls into the notch 598, the arm 604 and latch 602 move rearwardly and impart a similar rearward movement to the rod 612 and arm 614. This movement of the arm 614 is imparted by a link 620 to another arm 622, the latter and the above-mentioned arm 562 being rigidly connected by a sleeve 624 freely receiving the shaft 542. Thus, the valve plunger 500 is moved to its "in" position, causing the cutter head to be automatically returned into its inoperative position at the end of each rounding operation. When the cutter head arrives in its inoperative position and the latch 506 falls within the notch in the plate 508, such movement of the latch, through the connections between it and the rod 600 on the bell crank 570, causes the rod 600 to swing into engagement with the tail of the latch 602 and disengage it from the rod 612. The valve plunger 500 is now freed for movement into its "out" position under the influence of its spring 502, and as a result, the cutter head again is urged toward its operative position. However, the cutter head is now locked in its inoperative position by the latch 506, and remains so until the control lever 30 is swung forwardly again.

The operation of the illustrated machine from the standpoints of the motion of the jack, the speed of the transfer of the point of operation of the cutter head upon the shoe about the periphery of its sole as well as the relation between the shoe following movement of the cutter head and the pressure with which it is biased against the work will next be described with reference to Figs. 24 and 25.

The outer circular scale of Fig. 24 indicates 72 stages in the performance of a complete rough rounding operation, all these stages being of the same duration. The variably spaced graduations on the sole represent the position of the operating point of the cutter head upon the sole for each of the stages of the outer circular scale. From an inspection of the graduations on the sole it is evident how the feeding movement of the work is slowed down at each end of the ball line as well as at the toe and heel ends of the sole. Between these localities, where the spacing of the graduations on the sole is relatively wide, the feeding movement of the work is relatively rapid. The slower feeding movements facilitate the interchange of the forepart gage and the crease guide in the vicinity of the outer and inner ball line and also improve the smoothness of the rounding cut at the localities where the curvature of the sole edge is the greatest or is subject to rapid change. This variable feeding movement is derived from the jack driving mechanism, which is fully disclosed and claimed in the above-mentioned Cleversey patent, and includes the gear 218, the motion of which is represented by the inner circular scale of Fig. 24, the latter being graduated in seventy-two stages corresponding to those of the outer circular scale.

It will be noted from the inner circular scale that between stages 43 and 46, there occurs an actual reversal in direction of rotation of the gear 218 which results in the shoe receiving a similar reversed rotation relatively to both the jack carrier and the frame. However, the velocity of this reversed rotation is not so great as to cause a reversal in the feeding movement of the shoe past the cutter head which is derived at this time from the rapid oscillatory movement of the carrier 44 about the axis 46. The reversed rotation of the work is necessary to maintain the above-mentioned desired relation of normalcy between the sole edge and the shoe following movement of the cutter head when the concave portion of the shank adjacent to the ball line is presented to the cutter head. At all other times during an operating cycle, the jack rotates at a variable velocity in the normal counterclockwise direction.

By this improved jack driving mechanism the shoe is so positioned that a relationship of normalcy between the sole edge and the shoe following movement of the cutter head is maintained precisely throughout the rounding cut, this relationship being indicated by the direction of the graduations on the sole all of which are normal to the sole edge. Accordingly, the point of engagement of the work with the gages does not move materially lengthwise of their work-engaging edges, and the tendency for the bearing pressure of the gages against the shoe to be increased, when the cutter head is cammed rearwardly by the shoe, is minimized to the utmost so far as the contour of the work is concerned.

The displacement of the cutter head forwardly and rearwardly of the machine, that is, the shoe following movement of the cutter head, is represented graphically for a typical shoe by the curve 622 in Figs. 24 and 25. For purposes of illustration and description, the cam 120 is represented as if it were fixed and it is assumed that the valve 484 rotates around the cam.

The contour of the cam 120 and the curve 622 are plotted in Fig. 25 with reference to a rectilinear base line so as to emphasize their shapes and relation, and the perpendiculars to the base line correspond, in length and spacing, to the radii of the cam 120 in Fig. 24, denoted by the graduations of the outer circular scale. Accordingly, the intersections of any radius in Fig. 24, or perpendicular in Fig. 25 with the cam 120 and the curve 622 indicate the effective portion of the cam and the displacement of the cutter head forwardly and rearwardly of the machine at the stage in question.

A rising slope on the cam 120 operates the plunger 582 of the valve 484 so as to restrict the passage of fluid from the pipe 492 into the pipe 583 and, therefore, to cause an increase in the fluid pressure in the fluid sysem. Conversely, a falling slope on the cam causes the valve 484 to bleed fluid in increasing amounts from the pipe 492 into the pipe 583 and, therefore, to diminish the fluid pressure in the fluid system.

At the beginning of a rounding operation (stage 0) the cutter head is held against the shoe with a low pressure which is gradually diminished up to stage 15. During this time, the cutter head is being cammed rearwardly of the machine by the shoe, as indicated by the rising slope of the curve 622, and the tendency of the inertia of the cutter head to increase its bearing pressure against the shoe is offset by the diminishing fluid pressure. As the operating point is carried around the toe end of the shoe, the rearward displacement of the cutter head stops and a forward displacement is begun (at stage 24). In anticipation of the need for a relatively high fluid pressure for biasing the cutter head against the shoe at this time, there is provided the rising slope on the cam 120 between stages 15 and 26, it being necessary to spread this slope over the range indicated for the sake of the cam following action of the plunger 582, although an increase in the fluid pressure is not actually required until the rearward movement of the cutter head is decelerated, approximately at stage 22. Immediately after the reversal of the cutter head movement, the cutter head is biased toward the shoe with a diminishing fluid pressure until stage 35 is reached, at which point the operating point of the cutter head upon the shoe is approaching the inner ball line. Now a slightly increased fluid pressure, extending through stage 42, is applied to the cutter head to insure that the crease guide 36 will be firmly seated within the welt crease. It will be understood by reference to the sole diagram of Fig. 24 that the operating point at this time will have entered the inside shank portion of the shoe where the margin of the sole may be, and usually is, curved upwardly toward the shoe upper, as a result of the sole laying operation. The above-mentioned increased pressure is desirable to overcome the tendency for the upwardly curved sole edge to prevent the crease guide from being fully seated in the welt crease.

Beyond stage 40 the cutter head is biased against the shoe by a pressure which diminishes up to stage 53, during which interval the cutter head terminates its forward movement and begins to move rearwardly of the machine. This rearward movement, although very gradual up to stage 50, is subject to considerable acceleration beginning at stage 51 and at this time, as noted above, the fluid pressure applied to the cutter head is still being reduced in order to prevent the bearing pressure of the cutter head upon the shoe from being increased unduly because of the inertia of the cutter head. The fluid pressure is the lowest at stage 53 at which the cutter head will have received much of its rearward acceleration and from this stage on, a rising slope on the cam 120, terminating at stage 62, causes fluid pressure to be built up in anticipation of the deceleration of the rearward movement of the cutter head, which terminates at stage 61, and the succeeding acceleration of the cutter head in the opposite direction.

From this time through stage 72, a falling slope on the cam 120 causes the fluid pressure to drop, as the outer side of the heel end of the shoe is being operated upon, to the level it had when the operation was started. This latter diminution of the fluid pressure compensates for the tendency of the inertia of the cutter head to build up the bearing pressure of the cutter head against the shoe owing to the deceleration of the forward movement of the cutter head, most of which occurs between stages 67 and 70.

From the foregoing it is evident that during each period of rearward acceleration of the cutter head the latter is urged against the shoe by a diminishing or low fluid pressure, whereby the danger of an excessive bearing pressure between the shoe and the cutter head is avoided. With each deceleration of the rearward movement of the cutter head and acceleration in the opposite direction, when the inertia of the cutter head tends to diminish its bearing pressure upon the shoe, an increasing or high fluid pressure is applied to the cutter head. Thus, the bearing pressure between the cutter head and the shoe is so equalized throughout the cycle as to avoid any excessive pressure which would cause the work to be marred or any insufficient pressure which might impair the shoe following action of the cutter head.

In addition, provision has been made, by a temporary and moderate increase in fluid pressure while the cutter head traverses the vicinity of the inner ball line of the shoe, for insuring that the crease guide 36, which positions the cutter head at this time, will not be prevented from becoming fully seated within the welt crease by the sole, if it is curved upwardly from the plane of the shoe bottom.

The operation of the machine will now be summarized.

With the machine in readiness for operation, the cutter head 10 is held in its rearward position by the engagement of the latch 506 (Figs. 1 and 17) with the plate 508 on the cutter head, the latter being biased forwardly by fluid pressure which is applied to the top of the piston 354. Fluid pressure is also applied to the plunger 24 of the jack operating mechanism 26 causing the plunger 24 to be advanced and the driving member 28 to be held in such a position as to remove clamping pressure from the jack pin 20. Assuming that the jack has been adjusted for the size of the shoe to be operated upon, by turning the hand wheel 290, the operator places a lasted shoe on the jack with the jack pin 20 inserted into the thimble of the last and with the forepart of the shoe or last resting on the forepart rest 22.

The operator now pulls the control lever 30 forward, causing the retraction of the latch 506 from the plate 508 and permitting the advance of the cutter head toward the shoe, the cutter head being guided by the operator during this movement so that the crease guide 36 enters and is seated within the welt crease of the shoe. The operator also pulls the lever 38 forwardly to permit the bottom rest yieldingly to engage the bottom of the shoe.

Figure 23:
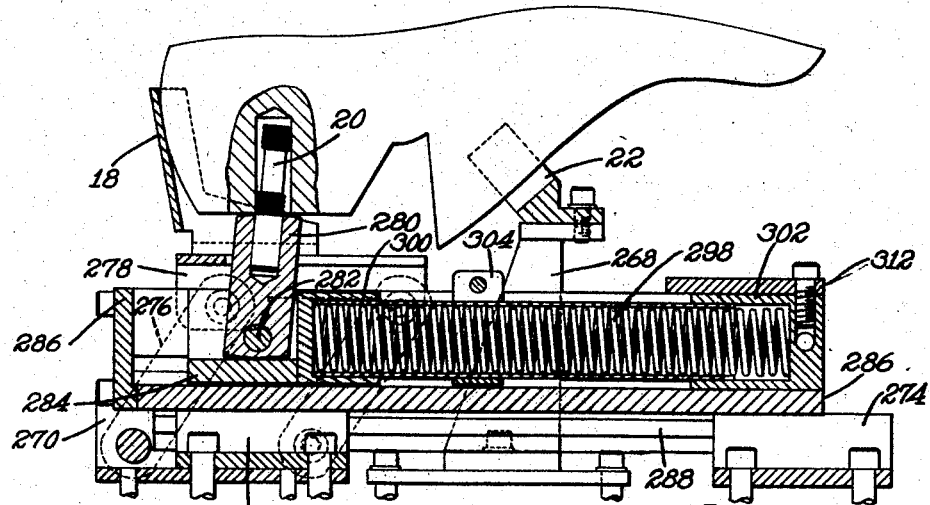
Fig. 23 is a sectional front elevation of the jack with a last clamped thereon.

At the beginning of the forward movement of the cutter head, the roll 516 (Fig. 17) moves away from the arm 518 which permits the valve 482 to be set so as to exhaust fluid from the cylinder 318 (Fig. 21) whereby the plunger 24 is permitted to be returned to its retracted position, by the spring 587, out of the path of movement of the jack. As the jack driving member 28 is released by the plunger 24, the jack pin 20 (Fig. 23) is moved rearwardly under the impulse of the spring 298 until the heel end of the shoe is brought into engagement with the heel abutment 18. At this time, a cramping action takes place between the jack pin 20 and the last which causes the forepart of the last to be pressed downwardly into firm engagement with the forepart rest 22. The last is now positioned, assuming the jack to have been properly adjusted, with the midpoint of its bottom at the axis of rotation of the jack on the carrier 44.

If for any reason the jacking of the shoe is unsatisfactory, the machine may be returned to its original condition by pushing the control lever 30 rearwardly, whereby the valve 480 (Fig. 21) is reset so as to cause fluid pressure to be applied to the lower end of the piston 354 and the cutter head to be returned to its rearward inoperative position. As the cutter head reaches the latter position, the roll 516 (Fig. 17) on the plate 508 swings the arm 518 rearwardly causing the valve 482 to be reset so as to exhaust fluid from the cylinder 318 and to permit the plunger 24 to return to its inoperative position. The shoe is thus unclamped from the jack which now may be readjusted, if necessary.

Assuming that a lasted shoe has been properly clamped upon the jack and that the cutter head has been brought into operative relation to the shoe, a cycle of operation of the machine is initiated by depressing the treadle 42 (Fig. 16) which permits the clutch collar 139 (Fig. 22) to be moved into driving engagement with the pulley 128 by the springs 140. The jack driving mechanism is thus put into operation and the cam 118 (Fig. 17) immediately operates the lever 592 so as to cause the retraction of the safety finger 532 from the plunger 534 of the valve 482. Accordingly, if it is necessary to retract the cutter head from the work (by pushing the control lever 30 rearwardly) before a cycle of operation of the machine is completed, the jack operating plunger 24 cannot be advanced into the path of the jack.

When the treadle 42 is first depressed, the bell crank 174 (Fig. 16) disengages the latch bar 150 from the forward end of the bell crank 152. The latch bar moves to the left and is held by the spring 153 with its rearward side in engagement with the forward end of the bell crank 152, the latter now being somewhat to the right of the notch 151 in the latch bar. At the beginning of the operation of the jack driving mechanism, the cycle control cam 155 is rotated so as immediately to present its "high," concentric portion to the roll 154 and therefore to swing the bell crank 152 to the extreme of its counterclockwise rotation. If it is desired to stop the jack at any time before its cycle of operation is completed, the operator depresses the treadle 139 which causes the latch bar 150 to be moved far enough to the right so that the forward end of the lever 152 is reengaged within the notch 151 in the latch bar. Such movement of the latch bar is accompanied by a similar movement of the yoke to the right which causes the clutch collar 139 (Fig. 22) to be disengaged from the pulley 128 and to be reengaged by the braking flange 144. The movement of the jack may be resumed at any time by again depressing the treadle 42.

Toward the end of a cycle of operation of the jack driving mechanism, the notch 156 (Fig. 16) in the cam 155 is presented to the roll 154, allowing the forward end of the bell crank 152 to be reengaged in the notch 151 in the latch bar 150 and, as the trailing rising slope of the notch is presented to the roll, the latch bar 150 and yoke 148 are moved far enough to the right to disengage the clutch collar 139 from the driving pulley 128, whereby the jack is stopped automatically.

Just before the end of a cycle of operation of the jack driving mechanism is completed, the cam follower 590 (Fig. 17) falls into the notch 598 in the cam 118, as a result of which the safety finger 532 is moved rearwardly into operative relation to the plunger 534 of the valve 482. Also, the arm 604 is swung downwardly, with the latch 602 hooked over the rod 612, so as to cause the valve 480 to be reset in such a manner as to effect the retraction of the cutter head away from the shoe into its inoperative position. As the cutter head reaches this position, the arm 518 is operated by the roll 516 so as to cause the valve 482 to be reset in such a manner as to effect the advance of the plunger 24 into engagement with the operating member 28 of the jack whereby the shoe is unclamped.

At the end of the movement of the cutter head into its inoperative position, the latch 506 falls into the notch in the plate 508 causing the rod 600 to disengage the latch 602 from the rod 612, whereby the valve plunger 500 of the valve 480 is permitted to return to its normal position. Fluid pressure is now applied to the top of the piston 354 (Fig. 1) and the cutter head is biased forwardly against the latch 506 in readiness for the next cycle of operation of the machine.

As fully disclosed in the above-mentioned Cleversey patent, the feeding movement of the work is variable in speed, as indicated by the spacing of the graduations normal to the periphery of the shoe S (Fig. 24), the shoe being oriented at all times so that the direction of the shoe following movement of the cutter head is perpendicular to the periphery of the shoe at the point of operation of the cutter head thereupon. The feeding movement is relatively slow while each end of the sole and its side portions in the vicinity of the ball line are presented to the cutter head, to insure a smooth rounding cut at these places and to facilitate the interchanges of the forepart gage and crease guide.

The cutter head is biased against the shoe with a pressure which is varied throughout the cycle so as to compensate for the effect of the inertia of the cutter head upon the bearing pressure between the cutter head and the work. At those times when the shoe following movement of the cutter head rearwardly of the machine is accelerated, and when the inertia of the cutter head tends to increase the pressure with which it bears against the work, the cutter head is biased against the work by the fluid pressure means 32 with a low and diminishing pressure controlled by a falling slope of the cam 120 (Figs. 24 and 25). Similarly, in anticipation of the deceleration of the rearward shoe following movement of the cutter head and its next accelerated forward movement, which occur while each end of the sole is being rounded, the cutter head is biased against the shoe with a relatively high and increasing pressure, under the control of a rising slope on the cam 120, so as to counteract the tendency of the inertia of the cutter head at this time to diminish its bearing pressure against the work.

In addition, the cutter head is biased against the shoe with a slightly increased pressure as the vicinity of the inner ball line is traversed in order to insure that the crease guide 36 will be fully seated within the welt crease.

The invention having thus been described, what is claimed as new and what it is desired to secure by Letters Patent of the United States is:

1. In a sole rounding machine having a cutter head and a jack for a lasted shoe, driving means for relatively moving said jack and cutter head progressively to transfer the point of operation of said cutter head upon the shoe about its periphery, said cutter head and jack also being relatively movable toward and away from each other to permit continuous engagement of the cutter head and shoe, said cutter head comprising gaging means for relatively positioning said cutter head and the shoe toward and away from each other by engagement with the side of the shoe upper, fluid operated means for holding the shoe and said cutter head in engagement with each other, and mechanism for controlling said fluid operated means to cause the shoe and said tool head to be held together with pressures which vary inversely to the tendency of the inertia of the cutter head to diminish and increase the bearing pressure between the shoe and said cutter head in response to the relative approaching and separating movements, respectively, of said cutter head and jack, whereby the bearing pressure between the shoe and cutter head is maintained uniform.

2. In a sole rounding machine having a cutter head and a jack for a lasted shoe which are movable relatively to each other progressively to present the periphery of the shoe to the cutter head, said cutter head comprising gaging means adapted to engage the side of the shoe upper and being mounted for movement toward and away from said jack under the control of said gaging means, fluid operated means for holding said cutter head in engagement with the shoe, said means including a valve for controlling said fluid operated means, and means for setting said valve to vary the pressure of said fluid operated means applied to said cutter head inversely to the tendency of the inertia of said cutter head to diminish and increase the bearing pressure of said cutter head upon the shoe as the point of operation of said cutter head upon the shoe moves toward and away from said jack, respectively, whereby the pressure of said cutter head upon the shoe is maintained uniform.

3. In a sole rounding machine having a cutter head and a jack for a lasted shoe which are movable relatively to each other to cause the point of operation of the cutter head upon the shoe to be progressively transferred about the periphery of the shoe, said cutter head comprising gaging means adapted to engage the side of the shoe upper and being mounted for movement toward and away from said jack under the control of said gaging means, and fluid operated means for urging said cutter head into engagement with the shoe, said means comprising a valve and a cam operated in synchronism with the relative movement of said cutter head and jack for operating said valve to cause the pressure of said fluid operated means applied to said cutter head to be increased and decreased to compensate for the effect of the inertia of said cutter head to decrease and increase the bearing pressure between said cutter head and shoe as the point of operation of said cutter head upon the shoe moves toward and away from said jack, respectively, whereby the bearing pressure between said cutter head and shoe is maintained uniform.

4. In a sole rounding machine having a cutter head and a jack for a lasted shoe which are movable relatively to each other progressively to present the periphery of the shoe to the cutter head, said cutter head and jack also being movable relatively toward and away from each other to permit the engagement of said cutter head and shoe to be maintained throughout the operation of the cutter head upon the shoe, means for urging said cutter head and the shoe in engagement with each other with an increasing pressure as the operating point of the cutter head upon the shoe passes from each extremity of the sole around the adjacent end portion thereof and thereafter with a diminished pressure until said operating point reaches the other extremity of the sole.

5. In a sole rounding machine having a cutter head and a jack for a lasted shoe which are rotated relatively to each other progressively to present the periphery of the shoe to the cutter head, said cutter head and jack also being movable in translation relatively to each other to maintain engagement of said cutter head and shoe throughout the said relative rotation of said cutter head and jack, driving means for imparting a cycle of relative rotation to said cutter head and jack, mechanism for relatively moving said cutter head and jack in translation with an increasing force as the operating point of said cutter head upon the shoe passes from each extremity of the sole around the adjacent end portion thereof and thereafter with a diminished force until said operating point reaches the other extremity of the sole.

6. In a sole rounding machine having a cutter head and a jack for a lasted shoe which are movable relatively to each other progressively to transfer the point of operation of the cutter head upon the shoe about the periphery thereof, means for applying pressure to said cutter head to hold it in engagement with the shoe, and control mechanism operated in timed relation to the relative movement of said cutter head and jack for actuating said means to apply increased pressure to said cutter head as the point of operation of the cutter head upon the sole passes each extremity thereof and for thereafter actuating said means to apply a diminished pressure to said cutter head until its point of operation upon the sole reaches the other extremity thereof.

7. In a sole rounding machine having a cutter head past which a jack carrying a lasted shoe is moved to present the periphery of the sole of the shoe to said cutter head, said cutter head being mounted for movement toward and away from said jack to permit engagement of said cutter head with the shoe to be maintained throughout the movement of said jack, and means for urging said cutter head into engagement with the shoe with a maximum pressure as the operating point of said cutter head upon the shoe passes from each extremity of the sole around the adjacent end portion thereof and thereafter with a diminished pressure until said operating point reaches the other extremity of the sole.

8. In a sole rounding machine having a cutter head past which a jack carrying a lasted shoe is moved to present the periphery of the sole of the shoe to said cutter head, driving means for imparting a cycle of movement to said jack, means for applying variable pressure to said cutter head to hold it in engagement with the shoe throughout the movement of said jack, and control mechanism operated by said driving means for actuating said pressure applying means to apply increasing pressure to said cutter head as the operating point thereof passes from each extremity of the sole around the adjacent end portion thereof and thereafter to apply a diminished pressure to said cutter head until its point of operation upon the sole reaches the other extremity thereof.

9. In a sole rounding machine having a cutter head past which a jack carrying a lasted shoe is moved to present the periphery of the sole of the shoe to said cutter head, driving means for imparting a cycle of movement to said jack, fluid operated means comprising a control valve for applying pressure to said cutter head to hold it in engagement with the shoe throughout the movement of said jack, and mechanism connected to said driving means for operating said valve to cause said cutter head to be held against the shoe with increasing pressure as the operating point of the cutter head upon the shoe passes from each extremity of the sole around the adjacent end portion thereof and thereafter with diminishing pressure until said operating point reaches the other extremity of the sole.

10. In a rough rounding machine, a cutter head upon which a forepart gage and crease guide are mounted for movement between operative and inoperative positions, a jack for presenting a shoe to be rounded to said cutter head, mechanism for moving said gage and guide in opposite directions to bring either said gage or guide into its operative position, and driving means for relatively moving said cutter head and jack to cause the point of operation of said cutter head upon the shoe to be transferred progressively about its periphery, said driving means cooperating with said mechanism to interchange the positions of said gage and guide at a predetermined stage in the rounding operation.

11. In a rough rounding machine, a cutter head, a jack for a lasted shoe, said cutter head and jack being relatively movable to cause the operating point of said cutter head upon the shoe to be transferred progressively about its periphery, said cutter head comprising a forepart gage and a crease guide each of which is mounted for movement into and out of an operative position, and means for moving said gage and guide in opposite directions at a predetermined stage of the relative movement of said cutter head and jack to bring one of said gage and guide into its operative position and the other out of its operative position.

12. In a rough rounding machine, a cutter head comprising a forepart gage and a crease guide each of which is mounted for movement upon said head between operative and inoperative positions, a jack for presenting the shoe to be rounded to said cutter head, driving means for relatively moving said cutter head and jack to cause the point of operation of said cutter head upon the shoe to be transferred progressively about its periphery, and mechanism operated by said driving means for moving said forepart gage and said guide successively into their operative positions upon the entry of the rounding cut into and its emergence from the forepart of the shoe, respectively.

13. In a rough rounding machine, a cutter head upon which a forepart gage and crease guide are mounted for movement between operative and inoperative positions, a jack for presenting a shoe to be rounded to said cutter head, driving means for operating said jack to cause the point of operation of said cutter head upon the shoe to be transferred progressively about its periphery, and mechanism operated by said driving means for moving said forepart gage into its operative position upon each emergence of the rounding cut from the shank portion of the shoe and for moving said crease guide into its operative position upon each entry of the rounding cut into the shank portion of the shoe.

14. In a rough rounding machine, a cutter head comprising a forepart gage and a crease guide each of which is mounted for movement upon said head into and out of an operative position, a jack for carrying a shoe to be operated upon by said cutter head, said head and jack being relatively movable to cause the operating point of said cutter head upon the shoe to be transferred progressively about its periphery, driving means for effecting said relative movement of said jack and cutter head, and mechanism driven by said driving means for variably positioning said gage and guide upon said cutter head and for moving said gage and guide selectively at predetermined stages in the rounding operation into their operative positions.

15. In a rough rounding machine, a cutter head, a jack for presenting a shoe to said cutter head, driving means for operating said jack to cause the point of operation of said cutter head upon the shoe to be transferred progressively about its periphery, said cutter head comprising a forepart gage and a crease guide each of which is mounted for movement upon said cutter head between an operative and an inoperative position, and mechanism operated by said driving means for positioning said gage and guide to determine the sole edge extension formed by the rounding cut, said mechanism also being constructed and arranged to move said gage and guide selectively into their operative positions at predetermined stages in the rounding operation.

16. In a rough rounding machine, a cutter head comprising a forepart gage and a crease guide each of which is mounted upon said head for movement between an operative and an inoperative position, a jack for presenting a shoe to be rounded to said cutter head, mechanism for positioning said gage and guide upon said head to vary the sole edge extension and for moving said gage and guide in opposite directions between their operative and inoperative positions, and driving means for operating said jack and said mechanism in timed relation to each other to cause the point of operation of said cutter head upon the shoe to be transferred progressively about its periphery and said gage and guide to be shifted between their operative and inoperative positions at a predetermined stage in the rounding operation.

17. In a rough rounding machine, a cutter head, a jack for a lasted shoe, driving means for relatively moving said cutter head and jack to cause the operating point of said cutter head upon the shoe to be transferred progressively about its periphery, a gage for positioning said cutter head with respect to the shoe when its fore and heel parts are operated upon, a guide for positioning the shoe when its shank portion is operated upon, said gage and guide being mounted for movement between operative and inoperative positions, and mechanism operated in timed relation to said driving means for interchanging the positions of said gage and guide when the operating point of said cutter head on the shoe passes the junctions of its shank portion with the fore and heel parts.

18. In a rough rounding machine, a cutter head, a jack for a lasted shoe, driving means for relatively moving said cutter head and jack to cause the operating point of said cutter head upon the shoe to be transferred progressively about its periphery, a gage for positioning said cutter head with respect to the shoe when its fore and heel parts are operated upon, a guide for positioning the shoe when its shank portion is operated upon, said gage and guide being mounted for movement between operative and inoperative positions, mechanism for operating said gage and guide to interchange their positions, and connections operated by said driving means for driving said mechanism to effect an interchange in the positions of said gage and guide when the operating point of said cutter head on the shoe passes each junction of its shank portion with its fore and heel parts.

19. In a rough rounding machine having a jack for a lasted shoe, a cutter head mounted for advancing movement into engagement with the shoe and for retractive movement into an inoperative position, driving means for imparting a cycle of relative movement to said jack and cutter head to cause the periphery of the shoe to be progressively presented to said cutter head, cutter head operating means for moving said head in opposite directions into and out of engagement with the shoe and comprising controlling means movable between cutter head advancing and retracting positions, said controlling means being biased toward and disposed normally in its cutter head advancing position, locking means for holding said cutter head in its inoperative position, operator controlled means for disengaging said locking means from said cutter head to permit its advance into engagement with the shoe, mechanism actuated by said driving means at the end of each cycle of its operation for setting said controlling means in its cutter head retracting position to cause the return of said cutter head to its inoperative position, and means operated in response to engaging movement of said locking means with said head and cooperating with said mechanism to permit said controlling means to return into its cutter head advancing position whereby said cutter head is biased against said locking means.

20. In a rough rounding machine having a jack for a lasted shoe, a cutter head mounted for advancing movement into engagement with the shoe and for retractive movement into an inoperative position, driving means for imparting a cycle of relative movement to said jack and cutter head to cause the periphery of the shoe to be progressively presented to said cutter head, fluid operated means for moving said head into and out of engagement with the shoe and comprising a control valve biased toward and normally disposed in a cutter head advancing position, locking means for holding said cutter head in its inoperative position, operator controlled means for disengaging said locking means from said cutter head to permit its advance into engagement with the shoe, mechanism operated at the end of each cycle of operation of said driving means for setting said valve in its cutter head retracting position to cause the return of said cutter head to its inoperative position, and means cooperating with said mechanism upon movement of said locking means into locking engagement with said cutter head to release said valve whereby it is permitted to return to its cutter head advancing position and said cutter head is biased against said locking means.

21. In a rough rounding machine having a jack for a lasted shoe, a cutter head mounted for advancing movement into engagement with the shoe and for retractive movement into an inoperative position, driving means for imparting a cycle of relative movement to said jack and cutter head to cause the periphery of the shoe to be progressively presented to said cutter head, cutter head operating means for moving said head in opposite directions into and out of engagement with the shoe and comprising controlling means movable between cutter head advancing and retracting positions, said controlling means being biased toward and disposed normally in its cutter head advancing position, locking means for holding said cutter head in its inoperative position, operator controlled means for disengaging said locking means from said cutter head to permit the advance of said head into engagement with the shoe, mechanism actuated by said driving means at the end of each cycle of its operation for setting said controlling means in its cutter head retracting position to cause the return of said cutter head to its inoperative position, said mechanism comprising separable connections, and means driven by said locking means during its movement into locking engagement with said cutter head for disengaging said separable connections thereby to permit said controlling means to return to its cutter head advancing position.

22. In a rough rounding machine having a jack for a lasted shoe, a cutter head mounted for advancing movement into engagement with the shoe and for retractive movement into an inoperative position, driving means for imparting a cycle of relative movement to said jack and cutter head to cause the periphery of the shoe to be progressively presented to said cutter head, said driving means comprising a cam, cutter head operating means for moving said head in opposite directions into and out of engagement with the shoe and comprising a controlling member movable between cutter head advancing and retracting positions, said member being biased toward and normally in its cutter head advancing position, locking means for holding said cutter head in its inoperative position, operator controlled means for disengaging said locking means from said cutter head to permit said head to be advanced into engagement with the shoe, mechanism actuated by said cam at the end of said cycle of relative movement for setting said controlling member in its cutter head retracting position whereby said cutter head is returned to its inoperative position, and means operated in response to locking movement of said locking means upon the return of said cutter head into its inoperative position for acting upon said mechanism to release said controlling member for movement into its cutter head advancing position whereby said cutter head is biased against said locking means.

23. In a rough rounding machine having a jack for a lasted shoe, a cutter head mounted for advancing movement into engagement with the shoe and for retractive movement into an inoperative position, driving means for imparting a cycle of relative movement to said jack and cutter head to cause the periphery of the shoe to be progressively presented to said cutter head, said driving means comprising a cam, fluid operated means for moving said cutter head from its inoperative position into engagement with the shoe and back to its inoperative position, said fluid operated means comprising a control valve normally biased into a cutter head advancing position, a latch movable into locking engagement with said cutter head for holding the latter in its inoperative position, mechanism actuated by said cam for setting said valve in a cutter head retracting position, said mechanism comprising separable connections, and means operated in response to locking movement of said latch upon the return of said cutter head into its inoperative position for disengaging said separable connections whereby said valve is permitted to return to its cutter head advancing position and said cutter head is biased against said latch.

24. In a rounding machine having a cutter head and a jack for a lasted shoe which are movable relatively to each other progressively to effect a rounding cut around the periphery of the shoe, means for advancing said cutter head into engagement with the shoe and for retracting it from the shoe into an inoperative position, jack operating means comprising a member movable into operative relation to said jack to remove from the last the clamping pressure of the jack thereupon, and mechanism operated in response to movements of said cutter head into and out of its inoperative position for actuating said jack operating means so as to move said member into and out of operative relation with respect to said jack, respectively.

25. In a rounding machine, a cutter head, a jack driving means for imparting a cycle of relative movement to said jack and cutter head progressively to effect a rounding cut around the periphery of the shoe, said cutter head being mounted for movement from an inoperative position into engagement with the shoe and back to its inoperative position, means for operating said jack to remove from the last the clamping pressure of the jack thereupon, mechanism operated by said cutter head upon its arrival in and departure from its inoperative position for actuating said jack operating means to release and apply, respectively, the clamping pressure of the jack upon the last, and means operated by said driving means for disconnecting said mechanism from said jack operating means at the start of said cycle and for connecting said mechanism and jack operating means upon the completion of said cycle.

26. In a rounding machine having a cutter head and a jack for a lasted shoe which are movable relatively to each other progressively to effect a rounding cut around the periphery of the shoe, operating means for said cutter head for advancing it into engagement with the shoe and for retracting it from the shoe into an inoperative position, said operating means comprising a controlling member movable between cutter head advancing and retracting positions, operator controlled means for moving said controlling member into its cutter head retracting position, jack operating means comprising a member movable from a retracted position into operative relation to said jack thereby to remove the clamping pressure of said jack upon the last, a second controlling member for controlling said jack operating means, and connections between said cutter head and said second controlling member operated by said cutter upon its arrival in and departure from its inoperative position for setting said second controlling member so as to cause advancing and retracting movement, respectively, of said jack operating member into and out of operative relation to said jack.

27. In a rounding machine, a cutter head, a jack for a lasted shoe, driving means for imparting a cycle of relative movement to said jack and cutter head progressively to effect a rounding cut around the periphery of the shoe, said cutter head being mounted for movement from an inoperative position into engagement with the shoe and back to its inoperative position, jack operating means comprising a member movable into operative relation to said jack to remove from the last the clamping pressure of the jack thereupon, said jack operating means including a controlling member, connections operated in response to movements of said cutter head into and out of its inoperative position for setting said controlling member so as to advance and retract, respectively, said jack operating member toward and from said jack, and means for preventing said controlling member from being operated until the cycle of operation of said driving means is completed.

28. In a rounding machine having a cutter head and a jack for a lasted shoe, driving means for imparting a cycle of relative movement to said jack and cutter head progressively to effect a rounding cut around the periphery of the shoe, jack operating means comprising a member movable from a retracted position into operative relation to said jack thereby to remove from the last the clamping pressure of the jack thereupon, said jack operating means including a controlling member, operating means for said cutter head for advancing it into engagement with the shoe and for retracting it from the shoe into an inoperative position, connections operated by movement of said cutter head into and out of its inoperative position for setting said controlling member so as to advance and retract, respectively, said jack operating member into and out of operative relation to said jack, said connections comprising an element movable into an inoperative position to prevent the operation of said controlling member by said connections, and means operated by said driving means for holding said element in its inoperative position throughout said cycle.

29. In a rounding machine, a cutter head, a jack for a lasted shoe, driving means for imparting a cycle of relative movement to said jack and cutter head progressively to effect a rounding cut about the periphery of the shoe, operating means for advancing said cutter head into engagement with the shoe and for retracting it therefrom into an inoperative position, said operating means comprising a controlling member movable between cutter head advancing and retracting positions, operator controlled means for moving said controlling member at any time into its cutter head retracting position, jack operating means comprising a member movable into operative relation to said jack to remove from the last the clamping pressure of the jack thereupon and a second controlling member, connections operated by movement of said cutter head into and out of its inoperative position for setting said second controlling member so as to advance and retract, respectively, said jack operating member toward and away from said jack, and means operated by said driving means for preventing the operation of said second controlling member by said connections throughout the cycle of operation of said driving means.

30. In a rounding machine having a cutter head and a jack for a lasted shoe which are movable relatively to each other progressively to effect a rounding cut around the periphery of the shoe, operating means for said cutter head for advancing it into engagement with the shoe and for retracting it from the shoe into an inoperative position, said operating means comprising a controlling member movable between cutter head advancing and retracting positions, locking means for holding said cutter head in its inoperative position, operator controlled means movable in one direction to disengage said locking means from said cutter head and in the opposite direction for setting said controlling member in its cutter head retracting position, jack operating means comprising a member movable from a retracted position into operative relation to said jack thereby to remove from the last the clamping pressure of said jack thereupon, a second controlling member for controlling said jack operating means, and connections operated by movements of said cutter head into and out of its inoperative position for setting said second controlling member so as to cause advancing and retracting movements, respectively, of said jack operating member into and out of operative relation to said jack.

31. In a rough rounding machine, a cutter head, a jack for a lasted shoe, driving means for operating said jack progressively to present the periphery of the shoe to said cutter head, a carrier upon which said jack is mounted for pitching movement, and mechanism for imparting a pitching movement to said jack to maintain a constant relation between the shoe bottom and the feeding movement of the shoe at the operating point of said cutter head upon the sole, said mechanism comprising a plurality of cams operated in synchronism with said driving means, and a plurality of followers one for each of said cams, said followers having an eccentric mounting which is movable to bring any one of said followers into operative relation to its associated cam.

32. In a rough rounding machine, a cutter head, a jack for a lasted shoe, driving means for operating said jack progressively to present the periphery of the shoe to said cutter head, a carrier upon which said jack is mounted for pitching movement, and mechanism for imparting a pitching movement to said jack to maintain a constant relation between the shoe bottom and the feeding movement of the shoe at the operating point of said cutter head upon the sole, said mechanism comprising a plurality of cams operated in synchronism with said driving means and means for selectively coupling any one of said cams with said mechanism.

33. In a rounding machine, a cutter head, a jack carrier upon which a jack for a lasted shoe is rotatably mounted progressively to present the sole edge of the shoe to said cutter head, a member mounted for rotation with said jack for operating said jack to remove its clamping pressure upon the last therefrom, and means for operating said member mounted upon said carrier, said means comprising an element mounted for movement directly toward and away from the axis of rotation of said jack transversely thereof into and out of engagement with said member.

34. In a rounding machine, a cutter head, a jack carrier upon which a jack for a lasted shoe is rotatably mounted progressively to present the sole edge of the shoe to said cutter head, said jack comprising a member which is operable to remove from the last the clamping pressure of said jack thereupon, and means carried by said carrier for operating said member, said means comprising an element mounted for movement in a direction extending transversely of and intersecting the axis of rotation of said jack.

35. In a rounding machine, a cutter head, a jack mounted to swing about one axis and to rotate about another axis progressively to present the periphery of a lasted shoe on said jack to said cutter head, a member for operating said jack to remove its clamping pressure upon the last therefrom, and means for operating said member mounted for swinging movement with said jack, said means comprising a plunger movable directly toward and away from the axis of rotation of said jack into and out of engagement with said operating member.

36. In a rounding machine, a cutter head, a jack for a lasted shoe mounted to oscillate about one axis and to rotate about another axis progressively to present the periphery of the shoe to said cutter head, and means for operating said jack to remove its clamping pressure upon the last therefrom, said means comprising a fluid operated plunger mounted to oscillate with said jack and for sliding movement directly toward and away from the axis of rotation of said jack.

37. In a rough rounding machine, a cutter head, a jack carrier upon which a jack for a lasted shoe is rotatably mounted to present the sole edge of the shoe to said cutter head, said jack comprising a forepart rest, a heel abutment and a jack pin, a support upon which said jack pin is mounted to move freely toward and away from said abutment, means for urging said support toward said heel abutment to clamp the last upon said jack, jack operating mechanism mounted upon said carrier and cooperating with said means to remove from the last the clamping pressure of the jack pin thereupon, and means for adjusting said heel abutment and said first mentioned means simultaneously with respect to said forepart rest.

38. In a rough rounding machine, a cutter head, a jack carrier upon which a jack for a lasted shoe is rotatably mounted to present the sole edge of the shoe to said cutter head, said jack comprising a forepart rest, a heel abutment and a jack pin, a slide movable toward and away from said jack pin to apply and remove, respectively, clamping pressure between said jack pin and the last, a carriage upon which said jack pin and slide are mounted for movement longitudinally of said jack, mechanism mounted upon said carriage for retracting said slide from said jack pin, and jack operating means comprising an element mounted upon said carrier for movement into and out of engagement with said mechanism in a direction intersecting the axis of rotation of said jack.

39. In a rough rounding machine, a cutter head, a jack carrier upon which a jack for a lasted shoe is rotatably mounted to present the sole edge of the shoe to said cutter head, said jack comprising a forepart rest, a heel abutment and a jack pin, said forepart rest being fixedly mounted upon said jack in a predetermined relation to the axis of rotation of said jack, a spring biased slide for urging said jack pin toward said abutment to clamp the last upon said jack, a carriage upon which said jack pin and slide are mounted for movement longitudinally of said jack, means for retracting said slide away from said jack pin comprising a member pivotally mounted upon said carriage, and jack operating means comprising a plunger mounted upon said carrier for movement into and out of engagement with said member directly toward and away from the axis of rotation of said jack.

40. In a rough rounding machine, a cutter head, a jack carrier upon which a jack for a lasted shoe is rotatably mounted to present the sole edge of the shoe to said cutter head, jack operating means mounted upon said carrier and comprising a plunger mounted to slide directly toward and away from the axis of rotation of said jack, said jack having fixed thereto a forepart rest in proximity to its axis of rotation, a heel abutment and jack pin mounted upon said jack for adjustment toward and away from said forepart rest, a spring biased slide for urging said jack pin toward said abutment to clamp the last upon the jack, means for retracting said slide away from said jack pin comprising an operating member disposed within the path of said plunger, and means for adjusting said heel abutment and said slide simultaneously lengthwise of said jack.

41. In a rough rounding machine, a cutter head, a jack carrier upon which a jack for a lasted shoe is rotatably mounted to present the sole edge of the shoe to said cutter head, said jack comprising a forepart rest, a heel abutment and a jack pin, jack operating means mounted upon said carrier and comprising an element mounted for movement directly toward and away from the axis of rotation of said jack, said forepart rest being fixedly mounted upon said jack adjacent to its axis of rotation, a spring biased slide for urging said jack pin toward said abutment to clamp the last upon said jack, a common support for said jack pin and slide, means for retracting said slide away from said jack pin comprising an operating member mounted upon said support and disposed within the path of movement of said element, and means for adjusting said heel abutment and said support simultaneously lengthwise of said jack.

42. In a jack for a lasted shoe, a fixed rest for supporting the forepart of the last, a jack pin for supporting the heel part of the last and mounted for movement toward and away from said rest at a constant level with respect thereto, a heel abutment mounted for movement toward and away from said rest in a direction incllined to said level whereby the height of said abutment with respect to said jack pin is varied simultaneously with its adjustment toward and away from said rest, and means for urging said jack pin toward said abutment to cause the last to be secured upon the jack.

43. In a jack for a lasted shoe, a fixed rest for supporting the forepart of the last, a jack pin for supporting the heel part of the last and mounted for movement toward and away from said rest at a constant level with respect thereto, a heel abutment mounted for movement in one direction toward said level and rest simultaneously and in the opposite direction away from said level and rest simultaneously, and means for urging said jack pin toward said abutment to cause the last to be secured upon the jack.

44. In a jack for a lasted shoe, a base upon which a forepart rest is fixed, a carriage mounted upon said base for movement lengthwise thereof, a jack pin mounted to slide freely upon said carriage lengthwise thereof at a constant level, means carried by said carriage for applying a clamping pressure to said jack pin, a heel abutment mounted for movement in one direction toward said level and rest and in the opposite direction away from said level and rest, and means for adjusting said abutment and carriage simultaneously toward and away from said forepart rest at different rates.

45. In a jack for a lasted shoe, a base upon which a forepart rest is fixed, a carriage mounted upon said base for movement lengthwise thereof, a heel abutment mounted upon said base for movement toward and away from said forepart rest, a holder for a jack pin mounted for sliding movement upon said carriage, a slide which is mounted upon said carriage for movement lengthwise thereof and is spring biased into engagement with said holder, and means for retracting said slide from said holder comprising a driving member mounted upon said carriage for movement therewith, and means for simultaneously adjusting said heel abutment and said carriage toward and away from said forepart rest.

46. In a jack for a lasted shoe, a base upon which a forepart rest is fixedly mounted, a heel abutment mounted for parallel movement on said base toward and away from said forepart rest, a carriage mounted upon said base for sliding movement lengthwise of the shoe, a jack pin mounted upon said carriage to slide freely lengthwise thereof, a spring biased slide mounted for movement upon said carriage to urge said jack pin toward said heel abutment, and means for simultaneously adjusting said abutment and said carriage lengthwise of the last.

47. In a jack for a lasted shoe, a base upon which a rest for the forepart of the last is fixed, a jack pin mounted for movement toward and away from said rest at a constant level, a heel abutment mounted upon said base for movement simultaneously toward and away from said rest and heightwise thereof, a spring biased slide for urging said jack pin toward said heel abutment to cause the last to be held against said rest and abutment, and means for adjusting said heel abutment and said slide lengthwise of the last simultaneously at different rates.

References Cited in the file of this patent

UNITED STATES PATENTS

| | | |
|---|---|---|
| 1,412,894 | Rigby | Apr. 18, 1922 |
| 1,513,807 | Furber | Nov. 4, 1924 |
| 2,133,370 | Bagshaw et al. | Oct. 18, 1938 |